(12) United States Patent
Kato

(10) Patent No.: US 11,267,474 B2
(45) Date of Patent: Mar. 8, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Daichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 129 days.

(21) Appl. No.: 16/546,327

(22) Filed: Aug. 21, 2019

(65) Prior Publication Data

US 2020/0094837 A1 Mar. 26, 2020

(30) Foreign Application Priority Data

Sep. 26, 2018 (JP) .............................. JP2018-180129

(51) Int. Cl.
*B60W 30/18* (2012.01)
*G05D 1/02* (2020.01)

(52) U.S. Cl.
CPC ..... *B60W 30/18163* (2013.01); *G05D 1/0214* (2013.01); *B60W 2520/10* (2013.01);
(Continued)

(58) Field of Classification Search
CPC ....... B60W 30/18163; B60W 2554/80; B60W 2520/10; B60W 2720/24; B60W 60/00;
(Continued)

(56) References Cited

U.S. PATENT DOCUMENTS 6,813,370 B1 * 11/2004 Arai ................... G06K 9/00798
382/104
7,366,595 B1 * 4/2008 Shimizu ................ B60Q 9/005
701/301
(Continued)

FOREIGN PATENT DOCUMENTS

| JP | 2004-206275 | 7/2004 |
| JP | 5991340 | 9/2016 |
| JP | 6046190 | 12/2016 |

*Primary Examiner* — Angelina Shudy
(74) *Attorney, Agent, or Firm* — Amin, Turocy & Watson, LLP

(57) ABSTRACT

A vehicle control device includes a preceding vehicle recognition unit which recognizes a preceding vehicle, a lane marking recognition unit which recognizes a lane marking for sectioning a lane in which a host vehicle travels, and a traveling control unit which performs first traveling control for causing the host vehicle to travel along a traveling route based on the lane marking recognized by the lane marking recognition unit in a case where the degree of recognition of the lane marking recognized by the lane marking recognition unit satisfies a predetermined standard, and performs second traveling control for causing the host vehicle to travel on the basis of a trajectory of the preceding vehicle recognized by the preceding vehicle recognition unit in a case where the degree of recognition of the lane marking recognized by the lane marking recognition unit does not satisfy the predetermined standard, and the traveling control unit changes the predetermined standard on the basis of a vehicle speed of the host vehicle.

14 Claims, 12 Drawing Sheets

(52) U.S. Cl.
CPC ..... *B60W 2554/80* (2020.02); *B60W 2720/24* (2013.01); *G05D 2201/0213* (2013.01)

(58) Field of Classification Search
CPC . B60W 60/001; G05D 1/0214; G05D 1/0088; G05D 2201/0213; G06K 9/00798
See application file for complete search history.

(56) References Cited

U.S. PATENT DOCUMENTS

| | | | | |
|---|---|---|---|---|
| 9,783,197 | B2* | 10/2017 | Aoki | B60W 10/20 |
| 9,827,811 | B1* | 11/2017 | McNew | B60N 2/90 |
| 10,466,706 | B2* | 11/2019 | Prasad | B62D 6/001 |
| 2003/0234127 | A1* | 12/2003 | Sudou | B60W 30/18145 180/170 |
| 2007/0233343 | A1* | 10/2007 | Saito | B62D 15/025 701/41 |
| 2010/0299000 | A1* | 11/2010 | Nakamura | G06K 9/00798 701/1 |
| 2012/0215377 | A1* | 8/2012 | Takemura | B60W 30/12 701/1 |
| 2015/0002284 | A1* | 1/2015 | Matsuno | B60Q 9/00 340/435 |
| 2015/0166062 | A1* | 6/2015 | Johnson | B60W 10/20 701/41 |
| 2015/0266508 | A1* | 9/2015 | Yoshihata | B60W 30/12 701/41 |
| 2016/0098605 | A1* | 4/2016 | Okada | G06K 9/6277 382/104 |
| 2016/0121889 | A1* | 5/2016 | Shimomura | B60W 50/14 701/41 |
| 2016/0288790 | A1* | 10/2016 | Aoki | B60W 30/165 |
| 2017/0008522 | A1* | 1/2017 | Sato | B60W 30/095 |
| 2017/0183007 | A1* | 6/2017 | Oh | B60W 50/14 |
| 2017/0227971 | A1* | 8/2017 | Shimotani | B60W 40/06 |
| 2017/0249518 | A1* | 8/2017 | Babala | G08G 1/167 |
| 2018/0047292 | A1* | 2/2018 | Hashimoto | G08G 1/0125 |
| 2018/0253975 | A1* | 9/2018 | Mizutani | B60W 30/16 |
| 2018/0348779 | A1* | 12/2018 | Oniwa | G06K 9/00798 |
| 2019/0071080 | A1* | 3/2019 | Shimizu | G06K 9/00798 |
| 2019/0077459 | A1* | 3/2019 | Miura | B62D 15/025 |
| 2019/0108755 | A1* | 4/2019 | Jeon | B62D 6/002 |
| 2019/0146489 | A1* | 5/2019 | Zaizen | B60W 40/08 701/42 |
| 2019/0205663 | A1* | 7/2019 | Ji | G08G 1/167 |
| 2019/0241184 | A1* | 8/2019 | Hayashi | G05D 1/0223 |
| 2019/0351901 | A1* | 11/2019 | Hori | G06T 7/60 |
| 2020/0070826 | A1* | 3/2020 | Watanabe | G06K 9/00825 |
| 2020/0207346 | A1* | 7/2020 | Tsuji | B60W 30/12 |
| 2020/0307582 | A1* | 10/2020 | Sato | B60W 60/0053 |
| 2020/0307590 | A1* | 10/2020 | VanderLugt | G08G 1/166 |

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-180129, filed Sep. 26, 2018, the content of which is incorporated herein by reference.

BACKGROUND

Field of the Invention

The present invention relates to a vehicle control device, a vehicle control method, and a storage medium.

Description of Related Art

In recent years, research has been conducted on a driving support function for supporting the driving and the steering of a vehicle, driving support control for keeping a vehicle in a lane along lane markings (hereinafter, referred to as lane keeping control), driving support control for making a vehicle follow a trajectory of a preceding vehicle (hereinafter, referred to as preceding vehicle following control), driving support control for making a vehicle travel on the basis of a distance between the vehicle and a target present in a horizontal direction (hereinafter, referred to a horizontal direction control), and the like.

A technique in which lane keeping control is preferentially adopted in a case where traveling control is performed by selecting at least one of lane keeping control, preceding vehicle following control, and horizontal direction control is known (for example, Japanese Unexamined Patent Application, First Publication No. 2004-206275). A technique for generating a target trajectory for each of lane keeping control and preceding vehicle following control and setting an offset target from both the trajectories in a case where both a lane marking and a preceding vehicle can be recognized is known (for example, Japanese Patent No. 5991340). A technique for stopping preceding vehicle following control in a case where it is recognized that a preceding vehicle has changed lane is known (for example, Japanese Patent No. 6046190).

SUMMARY

However, in the related art, in a case where it is difficult to continuously recognize a lane marking due to reasons such as fading of the lane markings, the weather, and shielding between a camera and a lane marking by surrounding vehicles, it may not be possible to appropriately determine a transition from control based on a lane marking to control in another mode.

The present invention is contrived in view of such circumstances, and an object thereof is to provide a vehicle control device, a vehicle control method, and a storage medium which are capable of appropriately determining a transition from control based on a lane marking to control in another mode.

A vehicle control device, a vehicle control method, and a storage medium according to the invention adopt the following configurations.

(1) A vehicle control device according to an aspect of the invention includes a preceding vehicle recognition unit which recognizes a preceding vehicle, a lane marking recognition unit which recognizes a lane marking for sectioning a lane in which a host vehicle travels, and a traveling control unit which performs first traveling control for causing the host vehicle to travel along a traveling route based on the lane marking recognized by the lane marking recognition unit in a case where the degree of recognition of the lane marking recognized by the lane marking recognition unit satisfies a predetermined standard, and performs second traveling control for causing the host vehicle to travel on the basis of a trajectory of the preceding vehicle recognized by the preceding vehicle recognition unit in a case where the degree of recognition of the lane marking recognized by the lane marking recognition unit does not satisfy the predetermined standard, in which the traveling control unit changes the predetermined standard on the basis of a vehicle speed of the host vehicle.

(2) In the aspect of (1), the traveling control unit may determine whether to perform the first traveling control or the second traveling control on the basis of whether or not the degree of recognition of a lane marking capable of being recognized to a furthest distant location by the lane marking recognition unit, out of lane markings on right and left sides of the host vehicle, satisfies the predetermined standard.

(3) In the aspect of (1), the traveling control unit may change the predetermined standard such that it becomes easier to continue the first traveling control and it becomes harder to transition to the second traveling control as the vehicle speed of the host vehicle increases.

(4) In the aspect of (3), an upper limit may be provided for a degree to which the predetermined standard is changed such that it is easy to continue the first traveling control and it is hard to transition to the second traveling control.

(5) In the aspect of (4), the predetermined standard may be that a recognized distance of the lane marking recognized by the lane marking recognition unit is equal to or greater than a threshold value.

(6) In the aspect of (1), the vehicle control device may further include a surrounding recognition unit which recognizes the surroundings where the host vehicle is traveling, in which in a case where the traveling control unit performs the second traveling control, the traveling control unit determines whether or not to perform the second traveling control on the basis of at least some of a condition regarding an inter-vehicle distance from the preceding vehicle recognized by the preceding vehicle recognition unit, a condition regarding the type of preceding vehicle recognized by the preceding vehicle recognition unit, and a condition regarding a moving direction of the host vehicle recognized by the surrounding recognition unit.

(7) In the aspect of (1), the traveling control unit may be capable of executing a mode of automatic driving not requiring gripping of a driving operator by a driver and a mode of automatic driving requiring gripping, the traveling control unit may determine to perform the first traveling control in a case where the mode of automatic driving not requiring gripping is executed, and the traveling control unit may determine whether to perform the first traveling control or the second traveling control in a case where the mode of automatic driving requiring gripping is executed.

(8) In the aspect of (7), the traveling control unit may make the predetermined standard vary depending on the degree of the automatic driving.

(9) In the aspect of (1), the traveling control unit may start a process for switching to the second traveling control in a case where it is predicted that lane markings will not be able to be recognized by the lane marking recognition unit.

(10) In the aspect of (1), the traveling control unit may store the trajectory of the preceding vehicle in a memory in preparation for the start of the second traveling control, may stop the recording of the trajectory of the preceding vehicle in a case where the preceding vehicle changes a lane, and may delete a result of the recording.

(11) A vehicle control method according to another aspect of the invention includes causing a computer to cause a host vehicle to recognize lane markings for sectioning a preceding vehicle and a lane in which the host vehicle travels, perform first traveling control for causing the host vehicle to travel along a traveling route based on the recognized lane marking in a case where the degree of recognition of the lane marking satisfies a predetermined standard, and perform second traveling control for causing the host vehicle to travel on the basis of a trajectory of the preceding vehicle in a case where the degree of recognition of the lane marking does not satisfy the predetermined standard, in which the predetermined standard is changed on the basis of a vehicle speed of the host vehicle.

(12) A (computer-readable non-transitory) storage medium according to still another aspect of the invention stores a program causing a computer to cause a host vehicle to recognize lane markings for sectioning a preceding vehicle and a lane in which the host vehicle travels, perform first traveling control for causing the host vehicle to travel along a traveling route based on the recognized lane marking in a case where the degree of recognition of the lane marking satisfies a predetermined standard, and perform second traveling control for causing the host vehicle to travel on the basis of a trajectory of the preceding vehicle in a case where the degree of recognition of the lane marking does not satisfy the predetermined standard, in which the predetermined standard is changed on the basis of a vehicle speed of the host vehicle.

According to the above-described (1) to (12), it is possible to appropriately perform determination for performing transition from control based on a lane marking to control in another mode.

According to (7), it is possible to properly use control based on automatic driving and control based on a lane marking.

DESCRIPTION OF EMBODIMENTS

Hereinafter, embodiments of a vehicle control device, a vehicle control method, and a storage medium of the present invention will be described with reference to the accompanying drawings.

First Embodiment

[Overall Configuration 1]

Figure 1:
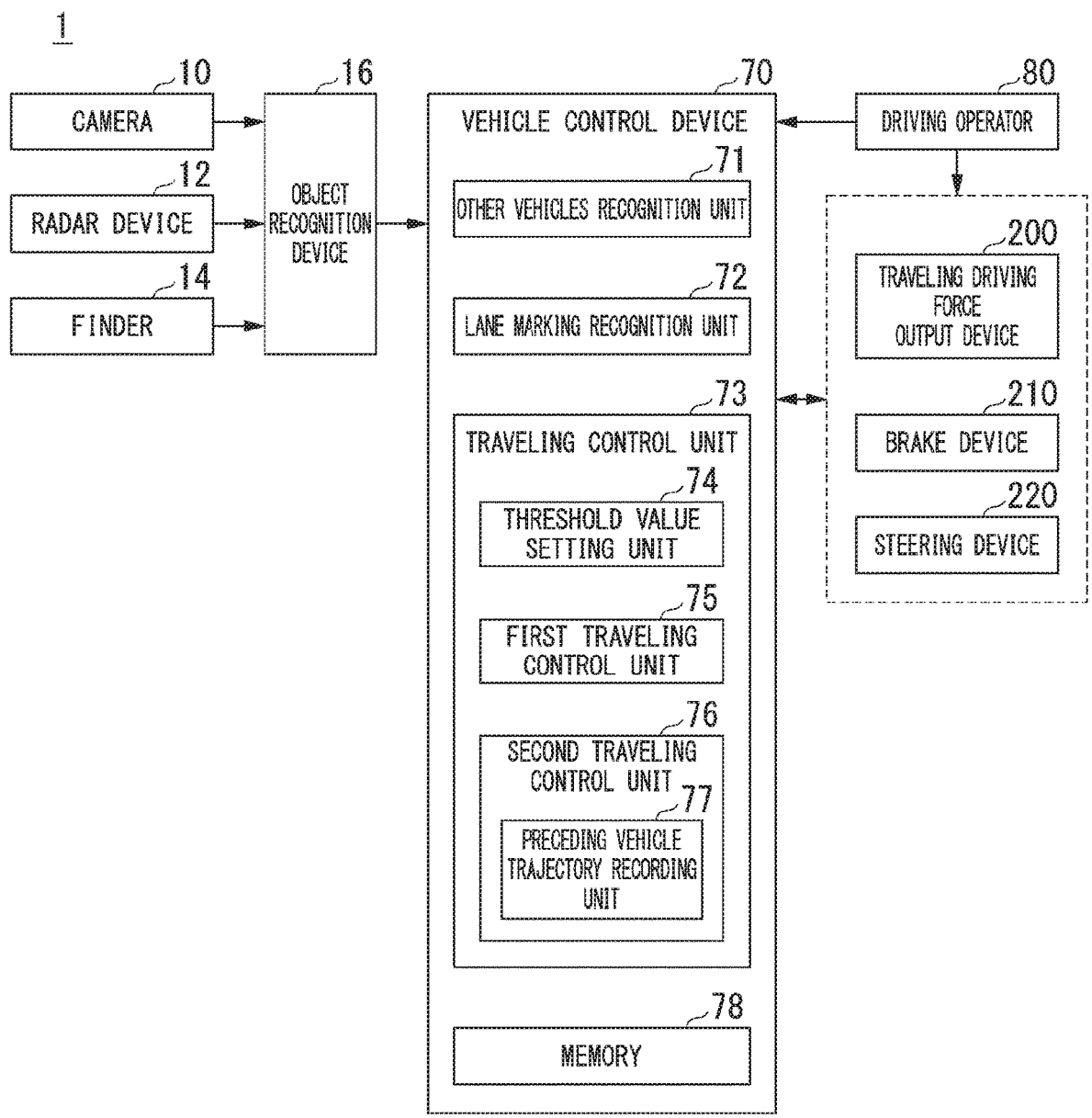
FIG. 1 is a configuration diagram of a vehicle system using a vehicle control device according to a first embodiment.

FIG. 1 is a configuration diagram of a vehicle system 1 using a vehicle control device according to a first embodiment. A vehicle equipped with the vehicle system 1 is a vehicle such as a two-wheeled, three-wheeled, or four-wheeled vehicle, and a driving source thereof is an internal combustion engine such as a diesel engine or a gasoline engine, an electric motor, or a combination thereof. The electric motor operates using power generated by an electric generator connected to an internal combustion engine or power discharged from a secondary battery or a fuel cell.

The vehicle system 1 includes, for example, a camera 10, a radar device 12, a finder 14, an object recognition device 16, a vehicle control device 70, a driving operator 80, a traveling driving force output device 200, a brake device 210, and a steering device 220. These devices and apparatuses are connected to each other through a multi-communication line such as a controller area network (CAN) communication line, a serial communication line, a wireless communication network, or the like. The configuration shown in FIG. 1 is merely an example, and a portion of the configuration may be omitted, or another configuration may be further added.

The camera 10 is a digital camera using a solid-state imaging element such as a charge coupled device (CCD) or a complementary metal oxide semiconductor (CMOS). The camera 10 is installed at any location of the vehicle (hereinafter, a host vehicle M) equipped with the vehicle system 1. In a case where a front side is imaged, the camera 10 is installed at an upper portion of a front windshield, on a back surface of a room mirror, or the like. For example, the camera 10 may repeatedly image the surroundings of the host vehicle M on a regular basis. The camera 10 may be a stereo camera.

The radar device 12 emits radio waves such as millimeter waves to the surroundings of the host vehicle M and detects radio waves (reflected waves) which are reflected by an object to detect at least the position (distance and direction) of the object. The radar device 12 is installed at any location of the host vehicle M. The radar device 12 may detect the position and speed of the object using a frequency modulated continuous wave (FM-CW) method.

The finder 14 is a light detection and ranging (LIDAR). The finder 14 irradiates the vicinity of the host vehicle M with light to measure scattered light. The finder 14 detects a distance to the object on the basis of a time from the emission of light to the reception of light. The emitted light may be, for example, a pulsed laser beam. The finder 14 is installed at any location of the host vehicle M.

The object recognition device 16 performs a sensor fusion process on detection results obtained by some or all of the camera 10, the radar device 12, and the finder 14 to recognize the position, type, speed, and the like of the object. The object recognition device 16 outputs recognition results to the vehicle control device 70. The object recognition device 16 may output detection results of the camera 10, the radar device 12, and the finder 14 to the vehicle control device 70. The object recognition device 16 may be omitted from the vehicle system 1.

The driving operator 80 includes, for example, an accelerator pedal, a brake pedal, a shift lever, a steering wheel, a modified steering wheel, a joystick, and other operators. A sensor that detects the amount of operation or whether or not an operation has been performed is attached to the driving operator 80, and the detection results are output to the vehicle control device 70 or some or all of the traveling driving force output device 200, the brake device 210, and the steering device 220.

The vehicle control device 70 may include, for example, an other vehicles recognition unit 71, a lane marking recognition unit 72, a traveling control unit 73, and a memory 78. The traveling control unit 73 includes a threshold value setting unit 74, a first traveling control unit 75, and a second traveling control unit 76. The second traveling control unit 76 includes a preceding vehicle trajectory recording unit 77 and the memory 78. Components other than the memory 78 are realized by executing a program (software) by a hardware processor such as a central processing unit (CPU). Some or all of the components may be realized by hardware (including a circuit unit; circuitry) such as a large scale integration (LSI), an application specific integrated circuit (ASIC), a field-programmable gate array (FPGA), or a graphics processing unit (GPU), or may be realized by cooperation of software and hardware. The program may be stored in advance in a storage device (a storage device including a non-transitory storage medium) such as an HDD or a flash memory of the vehicle control device 70 or may be stored in a detachable storage medium (non-transitory storage medium) such as a DVD or a CD-ROM, or a storage medium may be mounted on a drive device to be installed in the HDD or the flash memory of the vehicle control device 70.

The memory 78 stores a trajectory of a preceding vehicle which is recorded by the preceding vehicle trajectory recording unit 77. The memory 78 may be realized by, for example, a random access memory (RAM), a register, a flash memory, an electrically erasable programmable read only memory (EEPROM), or the like.

The other vehicles recognition unit 71 recognizes other vehicles including a vehicle preceding the host vehicle M. The preceding vehicle may be, for example, a vehicle that travels in the same moving direction as the host vehicle M in the same lane as the host vehicle M and can be classified as the same type as the host vehicle M positioned within a predetermined inter-vehicle distance from the host vehicle. The other vehicles recognition unit 71 does not include a heavy traffic and a two-wheeled car in a preceding vehicle PV, for example, in a case where the host vehicle M is a normal vehicle. The other vehicles recognition unit 71 outputs recognition results to the traveling control unit 73 and the threshold value setting unit 74. The other vehicles recognition unit 71 is an example of a "preceding vehicle recognition unit".

The lane marking recognition unit 72 recognizes a lane marking for partitioning the left and the right of a lane in which the host vehicle M travels. The lane marking may include continuous lane markings (so-called road section lines) such as white, yellow, solid, and broken lines and intermittent lane markings such as Cat's Eyes or Botts' Dots. The lane marking recognition unit 72 outputs recognition results to the traveling control unit 73 and the threshold value setting unit 74. The degree of reliability indicating a probability of the degree of recognition may be set for the recognition results of the lane marking recognition unit 72.

The traveling control unit 73 determines which of the first traveling control unit 75 and second traveling control unit 76 controls the traveling of the host vehicle M to control the traveling of the host vehicle M. The traveling control unit 73 may determine that any of the first traveling control unit 75 and the second traveling control unit 76 does not control the traveling of the host vehicle M. The traveling control unit 73 outputs a control command to the determined control unit (the first traveling control unit 75 or the second traveling control unit 76) in the case that the traveling control unit 73 determines that either the first traveling control unit 75 or the second traveling control unit 76 to control the traveling of the host vehicle M. The traveling control unit 73 may output a traveling control instruction of the host vehicle M to the traveling driving force output device 200, the brake device 210, and the steering device 220.

The traveling control unit 73 includes, for example, the threshold value setting unit 74, the first traveling control unit 75, and the second traveling control unit 76. The threshold value setting unit 74 sets a threshold value Th to be referred to by the traveling control unit 73. The threshold value Th is an example of a threshold value used as a predetermined standard used for the determination of the degree of recognition of a lane marking of the lane marking recognition unit 72.

For example, the threshold value setting unit 74 derives the threshold value Th by Expression (1) shown below.

$$Th = V*THW \qquad (1)$$

Here, V is a vehicle speed of the host vehicle M, and THW is a time (a vehicle head time until the vehicle stops) which is required when the host vehicle M stops with a margin and is a fixed value of, for example, 1.5 to 2.0 [seconds]. Therefore, the threshold value setting unit 74 derives a value proportional to a vehicle speed V of the host vehicle M as a threshold value Th.

However, the threshold value setting unit 74 may provide an upper limit value (for example, any value within 30 [m]) for a threshold value. Thereby, the traveling control unit 73 is configured such that second traveling control is preferentially executed due to the threshold value Th being set to be relatively low during low-speed traveling of the host vehicle M and first traveling control is preferentially executed during high-speed traveling of the host vehicle M. In the following description, an upper limit value of a threshold value will be referred to as $Th_{max}$.

The traveling control unit 73 may perform control for returning the control to the first traveling control or switching the control to manual control by an occupant of the host vehicle M in a case where traveling under the second traveling control is continued by a predetermined distance or for a predetermined period of time.

The traveling control unit 73 starts a process of switching to the second traveling control (for example, the recording of trajectory points to be described later) in a case where it is predicted that a lane marking will not be recognized or will be difficult to recognize due to bad weather or the like. In this case, the traveling control unit 73 may add a probability of map information of a course of the host vehicle M and a set degree of reliability of the lane marking recognition unit 72 to a determination material regarding whether or not to switch to the second traveling control.

Figure 2:
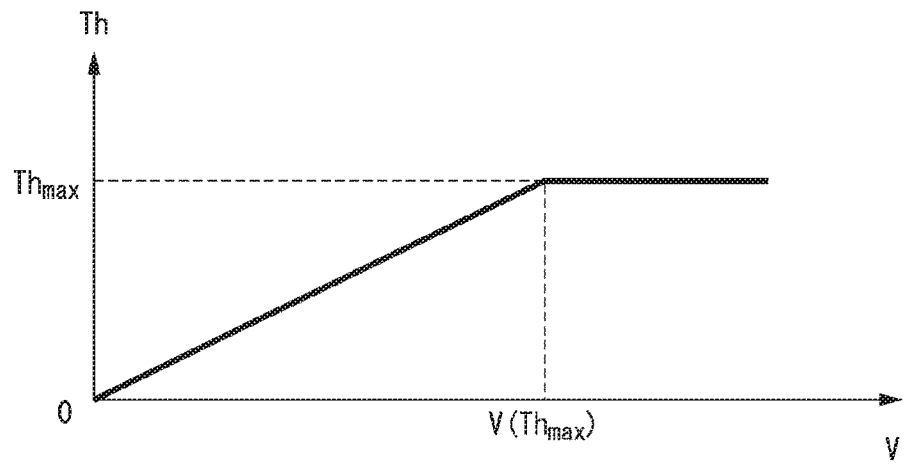
FIG. 2 is a graph showing a tendency of derivation of a threshold value.

FIG. 2 is a graph showing a tendency of derivation of the threshold value Th based on Expression (1). As shown in FIG. 2, the threshold value setting unit 74 sets a value proportional to the vehicle speed V of the host vehicle M for the threshold value Th until the vehicle speed V reaches a predetermined vehicle speed (hereinafter, referred to as $V(Th_{max})$) and sets $Th_{max}$ for the threshold value Th when the vehicle speed V is equal to or greater than $V(Th_{max})$.

Figure 3:
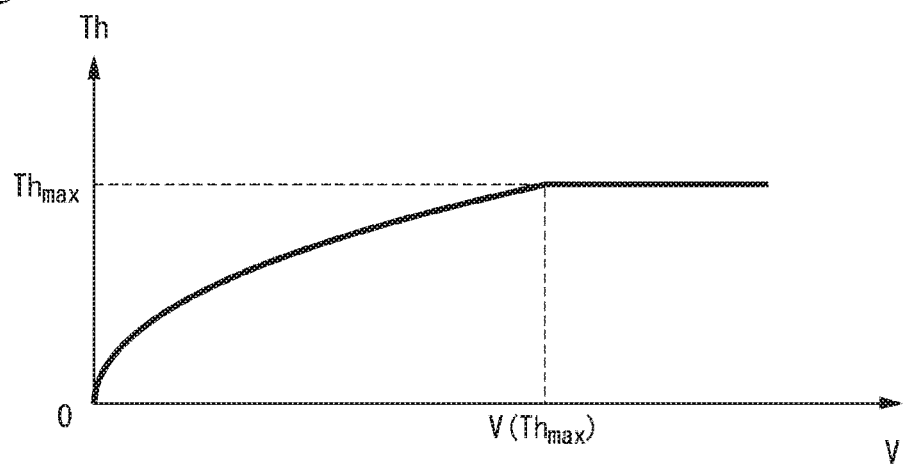
FIG. 3 is a graph showing another example of a tendency of derivation of a threshold value.
Figure 4:
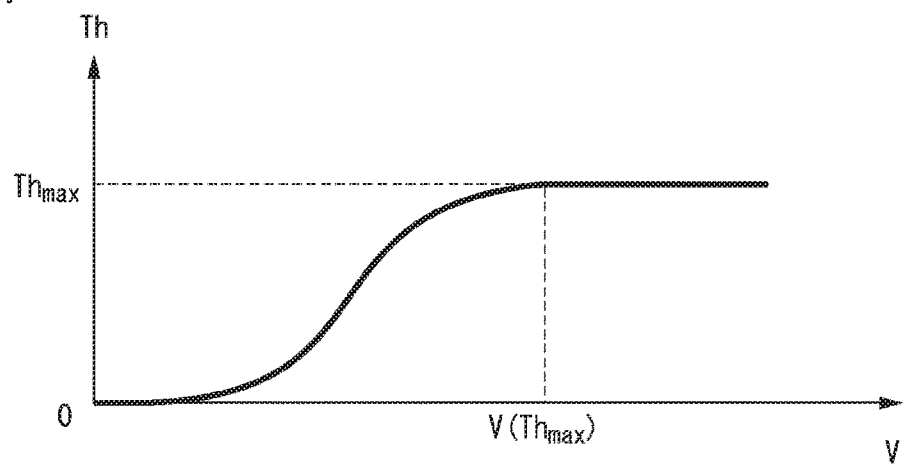
FIG. 4 is a graph showing still another example of a tendency of derivation of a threshold value.

FIGS. 3 and 4 are graphs showing another example of a tendency of derivation of the threshold value Th. The threshold value setting unit 74 may derive the threshold value Th so as to draw a curve protruding upward instead of a proportional relationship between the vehicle speed V and the threshold value Th as in the derivation tendency shown in FIG. 3, or may derive the threshold value Th so that a change in a case of a low speed or a change in the vicinity of the upper limit value $Th_{max}$ becomes gentle by using, for example, a sigmoid curve as in the derivation tendency shown in FIG. 4.

The traveling control unit 73 causes the first traveling control unit 75 to control the traveling of the host vehicle M (first traveling control) in a case where a lane marking recognized by the lane marking recognition unit 72 is recognized to a distance equal to or greater than the threshold value Th when seen from the host vehicle M. The traveling control unit 73 causes the second traveling control unit 76 to control the traveling of the host vehicle M (second traveling control) in a case where a lane marking recognized by the lane marking recognition unit 72 is not recognized to a distance equal to or greater than the threshold value Th when seen from the host vehicle M. The first traveling control unit 75 causes the host vehicle M to travel along a traveling route based on a lane marking recognized by the lane marking recognition unit 72 as the first traveling control. The second traveling control unit 76 causes the host vehicle M to travel along a trajectory of a preceding vehicle recognized by the other vehicles recognition unit 71 as the second traveling control. The traveling control unit 73 preferentially executes the second traveling control in a case where it is difficult for the lane marking recognition unit 72 to recognize a lane marking due to bad weather or deterioration, wear, or the like of the lane marking.

Alternatively, in a case where the lane marking recognized by the lane marking recognition unit 72 is not clearly visible (a low degree of reliability of recognition) such as a break due to abrasion or deletion, or indistinctness, the traveling control unit 73 may switch to the second traveling control on the assumption that the degree of recognition does not satisfy a predetermined standard. The traveling control unit 73 may switch to the second traveling control on the assumption that the degree of recognition does not satisfy the predetermined standard in both a case where the lane marking recognized by the lane marking recognition unit 72 is not recognized to a distance equal to or greater than the threshold value Th and a case where the degree of reliability of recognition of the lane marking recognized by the lane marking recognition unit 72 is low. That is, the wording "the degree of recognition does not satisfy the predetermined standard" may be any of "the lane marking recognized by the lane marking recognition unit 72 is not recognized to a distance equal to or greater than the threshold value Th", "the degree of reliability of recognition of the lane marking recognized by the lane marking recognition unit 72 is low", and "any one of a condition that the lane marking recognized by the lane marking recognition unit 72 is not recognized to a distance equal to or greater than the threshold value Th and a condition that the degree of reliability of recognition of the lane marking recognized by the lane marking recognition unit 72 is low is satisfied".

The second traveling control unit 76 includes, for example, the preceding vehicle trajectory recording unit 77. The preceding vehicle trajectory recording unit 77 records points of a trajectory (hereinafter, trajectory points) through which a representative point (for example, the center of gravity of a preceding vehicle or a rear wheel shaft center) of a preceding vehicle passes in the memory 78 at predetermined time intervals. The preceding vehicle trajectory recording unit 77 may erase the records of the trajectory points from the memory 78 on a regular basis or may erase the records of the trajectory points through which the host vehicle M passes from the memory 78. The preceding vehicle trajectory recording unit 77 records trajectory points in the memory 78 in preparation for the start of the second traveling control even in a time slot in which the second traveling control is not performed.

In a case where a preceding vehicle changes a lane, the preceding vehicle trajectory recording unit 77 deletes trajectory points from the memory 78. The change of the lane of the preceding vehicle may include movement from a main line to a branch path at a branch point.

The traveling driving force output device 200 outputs a traveling driving force (torque) for the vehicle to travel to a driving wheel. The traveling driving force output device 200 includes a combination of, for example, an internal combustion engine, an electric motor, a gearbox, and the like and an ECU controlling them. The ECU controls the above-described components in accordance with information which is input from the driving operator 80.

The brake device 210 includes, for example, a brake caliper, a cylinder transmitting hydraulic pressure to the brake caliper, an electric motor generating hydraulic pressure in the cylinder, and a brake ECU. The brake ECU controls the electric motor in accordance with information which is input from the driving operator 80 and makes a brake torque based on a braking operation be output to each wheel. The brake device 210 may include a mechanism for transmitting hydraulic pressure generated through an operation of the brake pedal included in the driving operator 80 to the cylinder through a master cylinder as a backup. The brake device 210 is not limited to the above-described configuration, and may be an electronic controlled hydraulic pressure brake device that controls an actuator in accordance with information input from the traveling control unit 73 and transmits hydraulic pressure of the master cylinder to the cylinder.

The steering device 220 includes, for example, a steering ECU and an electric motor.

For example, the electric motor applies a force to a rack and pinion mechanism to change the direction of a steered wheel. The steering ECU drives the electric motor in accordance with information input from the traveling control unit 73 or information input from the driving operator 80 to change the direction of the steered wheel.

[Switching of Traveling Control]

Figure 5:
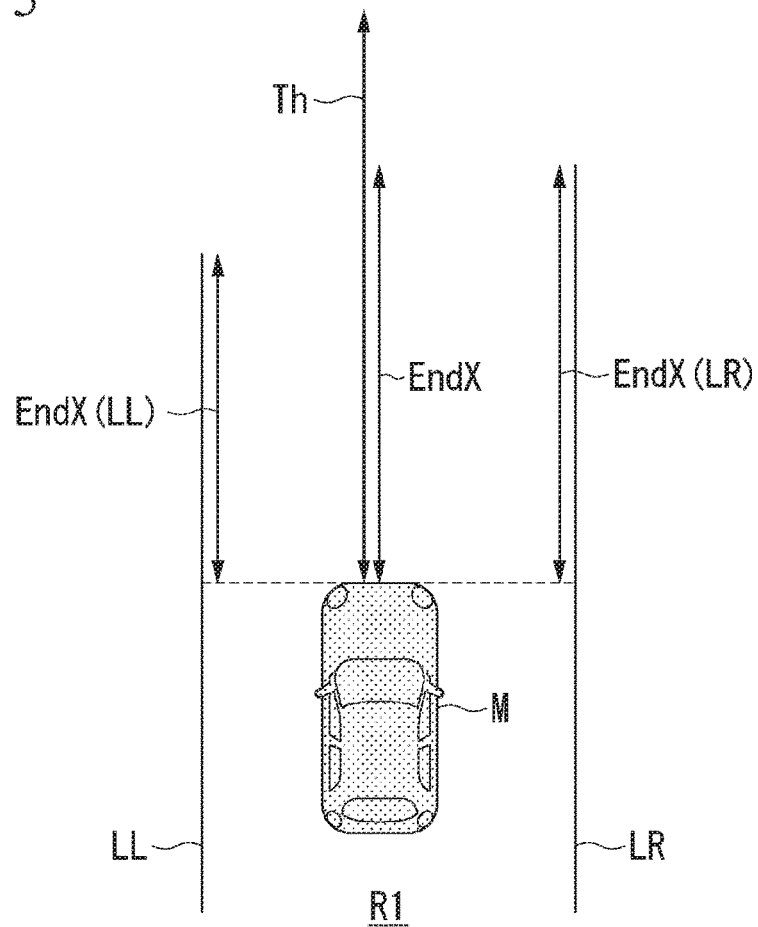
FIG. 5 is a diagram showing a relationship between a threshold value and a recognized distance recognized by a lane marking recognition unit.

Hereinafter, a method of controlling which of the first traveling control and the second traveling control is performed by the traveling control unit 73 will be described in more detail. FIG. 5 is a diagram showing a relationship between a threshold value Th and a recognized distance EndX which is recognized by the lane marking recognition unit 72.

As shown in FIG. 5, the lane marking recognition unit 72 recognizes a lane marking LL on the left side of a lane R1 during traveling of the host vehicle M and recognizes a recognized distance EndX(LL) which is a distance regarding to what extent the lane marking LL in a moving direction of the host vehicle M can be recognized. Similarly, the lane marking recognition unit 72 recognizes a lane marking LR on the right side of the traveling lane R1 of the host vehicle M and recognizes a recognized distance EndX(LR) of the lane marking LR in a moving direction of the host vehicle M.

The lane marking recognition unit 72 compares the recognized distance EndX(LL) and the recognized distance EndX(LR) with each other and sets a recognized distance capable of being recognized to a furthest distant location as the recognized distance EndX. In the example shown in FIG. 5, the lane marking recognition unit 72 sets the recognized distance EndX(LR) as the recognized distance EndX. The traveling control unit 73 determines traveling control on the basis of the recognized distance EndX set by the lane marking recognition unit 72 and the threshold value Th.

The lane marking recognition unit 72 may set the recognized distance EndX in accordance with the degree of reliability of recognition. In a case where lane markings have become damaged due to abrasion or omission or have become indistinct, the lane marking recognition unit 72 sets a low degree of reliability. The lane marking recognition unit 72 may correct a recognition result in accordance with the degree of reliability. For example, in a case where the degree of reliability is low, the recognized distance EndX is corrected so as to have a lower degree of reliability than that of the actual recognized distance.

In a case where the memory 78 stores map information including a traveling lane or map information stored in an external device such as a navigation device which can be referred to, the lane marking recognition unit 72 may change the recognized distance EndX in accordance with whether a recognized lane marking is at a location which is remembered as having a lane marking on a map or at a location which is remembered as not having a lane marking. For example, when the recognized lane marking is at a location which is remembered as having a lane marking on a map, the lane marking recognition unit 72 may correct the recognized distance EndX so as to be longer than the actual recognized distance.

The traveling control unit 73 may determine traveling control in accordance with the type, size, width, and length of a vehicle preceding the host vehicle M and the width of a diagonal line on which the host vehicle M is traveling. For example, the length of a hybrid trajectory (the length of time until the transition is completed) may be changed.

[Target Track During Transition of Traveling Control]

Figure 6:
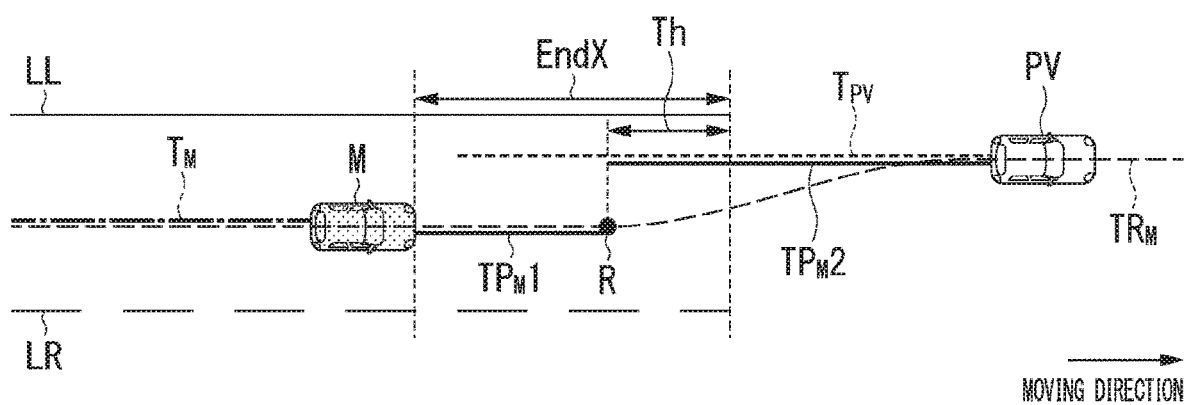
FIG. 6 is a diagram showing a traveling target trajectory of a host vehicle when a traveling control unit transitions from first traveling control to second traveling control.

FIG. 6 is a diagram showing a target trajectory of the host vehicle M when the traveling control unit 73 transitions from the first traveling control to the second traveling control.

In FIG. 6, a positional relationship between the host vehicle M, a preceding vehicle PV, and lane markings LR and LL for sectioning the traveling lane R1 of the host vehicle M is shown. In FIG. 6, a transiting trajectory $T_M$ indicating a trajectory along which the host vehicle M passes, a passage trajectory $T_{PV}$ of the preceding vehicle PV, a target trajectory $TP_M$ of the host vehicle M, and a traveling trajectory $TR_M$ (broken line) along which the host vehicle M travels are shown. As shown in FIG. 6, the target trajectory $TP_M$ of the host vehicle includes a target trajectory $TP_M1$ under the first traveling control and a target trajectory $TP_M2$ under the second traveling control.

In the host vehicle M shown in FIG. 6, when the target trajectory $TP_M1$ is set and the host vehicle travels in a first traveling control state to reach a point R, it is assumed that the traveling control unit 73 determines that a lane marking recognized by the lane marking recognition unit 72 is not recognized to a distance equal to or greater than the threshold value Th when seen from the host vehicle M. The traveling control unit 73 determines to set traveling control to be second traveling and starts to generate the target trajectory $TP_M2$ at the time of transitioning to the second traveling control on the basis of the passage trajectory $T_{PV}$ of the preceding vehicle PV. In the following description, a time when the generation of a target trajectory is started at the time of transitioning to the second traveling control is set to be t, and one control period is set to be $t_a$.

Figure 7:
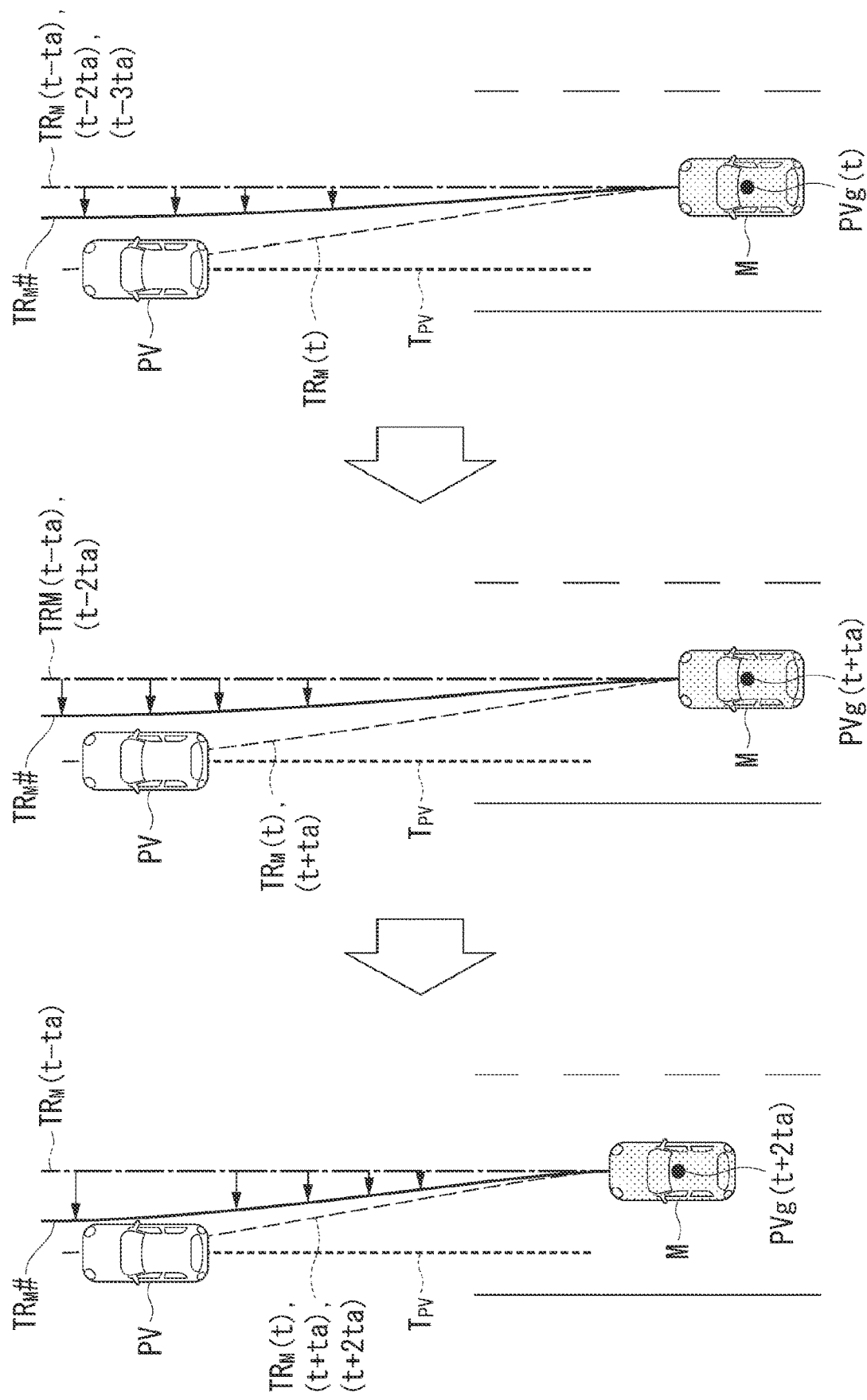
FIG. 7 is a diagram showing a relationship between a target trajectory of a host vehicle and a final traveling trajectory.

FIG. 7 is a diagram showing a relationship between the target trajectory $TP_M$ of the host vehicle M shown in FIG. 6 and a final traveling trajectory $TR_M\#$.

For example, as shown in a right diagram of FIG. 7, the traveling control unit 73 sets a traveling trajectory $TR_M(t)$ having a representative point $PVg(t)$ of the preceding vehicle PV at time t as an arrival target. The traveling control unit 73 may set any one trajectory point of the passage trajectory $T_{PV}$ of the preceding vehicle PV which has been recorded to be an arrival target, instead of the representative point $PVg(t)$ at the time t. A middle part of FIG. 7 is a diagram showing various trajectories which are set at time $t+t_a$ after one cycle of time t. A left diagram of FIG. 7 is a diagram showing various trajectories set at time $t+2t_a$ after one cycle of the time $t+t_a$.

For example, the traveling control unit 73 may perform moving average arithmetic calculation of the traveling trajectory $TR_M(t)$ set at the time t and traveling trajectories $TR_M(t-t_a)$, $TR_M(t-2t_a)$, ..., $TR_M(t-nt_a)$ (n is a natural number; the example shown in FIG. 7 is n=4) to several steps which are set before the time t, and perform control such that the host vehicle M travels along the final traveling trajectory $TR_M$ #which is a calculation result. As shown in FIG. 7, the final traveling trajectory $TR_M$ #which is an arithmetic result slowly approaches the passage trajectory $T_{PV}$. In the following description, a target trajectory which is transitioning from one traveling control to the other traveling control will be referred to as a "hybrid trajectory".

The traveling control unit 73 sets the hybrid trajectory as shown in FIG. 7 as a traveling trajectory, and thus it is possible to smoothly perform an operation even when traveling control transitions, reduce discomfort and anxiety given to an occupant of the host vehicle M, and improve the occupant's riding comfort. In a case where transition of traveling control is performed without generating the hybrid trajectory as shown in FIG. 7 such as a case where switching of traveling control is performed in a short period of time, the traveling control unit 73 may reduce discomfort and anxiety given to an occupant of the host vehicle M and improve the occupant's riding comfort by imposing a limitation on a horizontal speed of the host vehicle M using a rate limiter so that the operation of the host vehicle M does not involve unexpected motion.

The traveling control unit 73 may change the length of the hybrid trajectory (a temporal length during transition) in accordance with the type, size, width, and length of a vehicle preceding the host vehicle M and the width of an oblique traveling road on which the host vehicle M travels.

[Confirmation of Interference During Transition of Traveling Control]

In a case where another vehicle OV other than the preceding vehicle PV is present in the vicinity of the host vehicle M during the above-described transition of traveling control, the traveling control unit 73 adds whether or not another vehicle OV interferes with the host vehicle M to target trajectory generation elements.

The traveling control unit 73 determines whether or not the host vehicle M and another vehicle OV may interfere with each other at time $t+kt_a$ (k is any natural number). The interference means that a distance between the center of gravity of the host vehicle M and the center of gravity of another vehicle OV is equal to or less than a predetermined distance and at least one of the host vehicle M and another vehicle OV will need to speed up or down in order to keep a fixed distance or more another vehicle or require steering different from that of a target trajectory in order to avoid the other vehicle.

Figure 8:
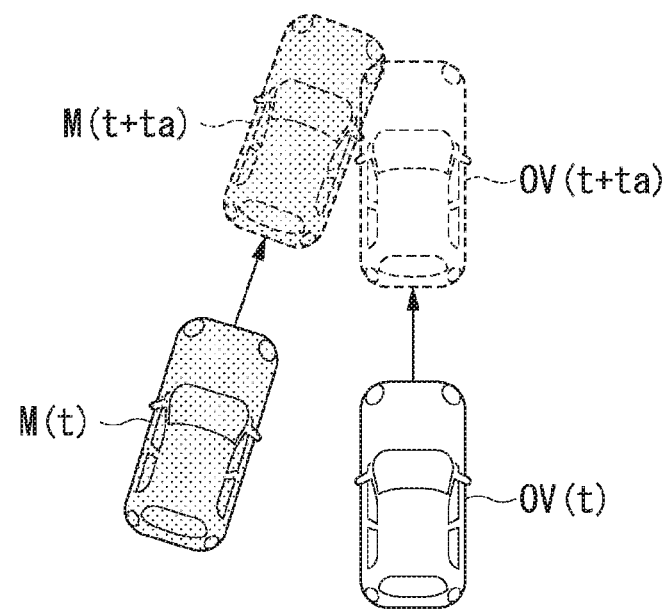
FIG. 8 is a diagram showing an example of a positional relationship between a host vehicle and another vehicle.

FIG. 8 is a diagram showing examples of a positional relationship between the host vehicle M and another vehicle OV at time t and a positional relationship there between which is predicted at time $t+t_a$ after one cycle of the time t. In a case where it is predicted that the host vehicle M and another vehicle OV have the predicted positional relationship shown in FIG. 8 at the time $t+t_a$, that is, a relationship in which the vehicles may interfere with each other, the traveling control unit 73 changes a target trajectory in order to avoid the interference. For example, the change of the target trajectory may be adopting a trajectory (the target trajectory $TP_M$ shown in FIG. 6) which has been created at the time t or may be adopting a new trajectory for keeping a fixed distance from another vehicle OV.

Figure 9:
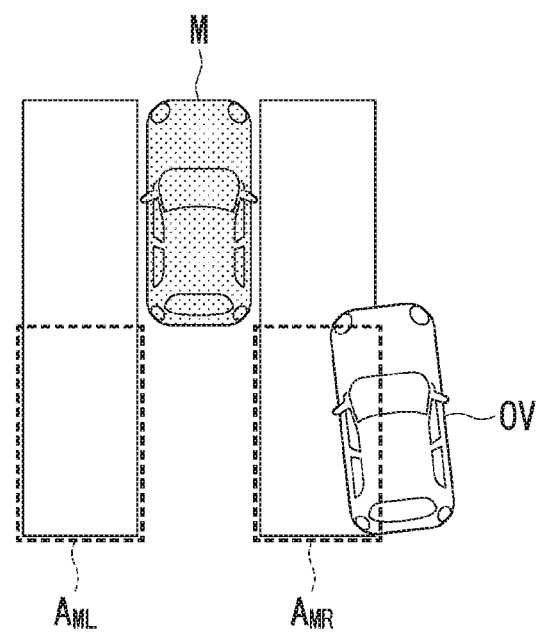
FIG. 9 is a diagram showing another example of a positional relationship between a host vehicle and another vehicle.

FIG. 9 is a diagram showing another example of a positional relationship between the host vehicle M and another vehicle OV. Even when another vehicle OV is present in a surrounding region (for example, $A_{ML}$ and $A_{MR}$ in FIG. 9) around the host vehicle M, the traveling control unit 73 may determine that the host vehicle M and another vehicle OV may interfere with each other. The surrounding region around the host vehicle M includes, for example, a region at a distance of approximately 1 [m] from the body of the host vehicle M in a direction perpendicular to a moving direction of the body of the host vehicle M and includes a region from a front end of the body to a rear end of the body in the moving direction and a region at a distance of approximately 4 to 5 [m] from the rear end of the body (however, a region in which there is a possibility of another vehicle OV being located at the time of following the host vehicle M is not included). For example, as shown in FIG. 9, in a case where another vehicle OV is present in a region $A_{MR}$ behind and to the right of the host vehicle M, the traveling control unit 73 may determine that the host vehicle M and another vehicle OV may interfere with each other and stops the transition of traveling control.

[Conclusion of Transition of Traveling Control]

Figure 10:
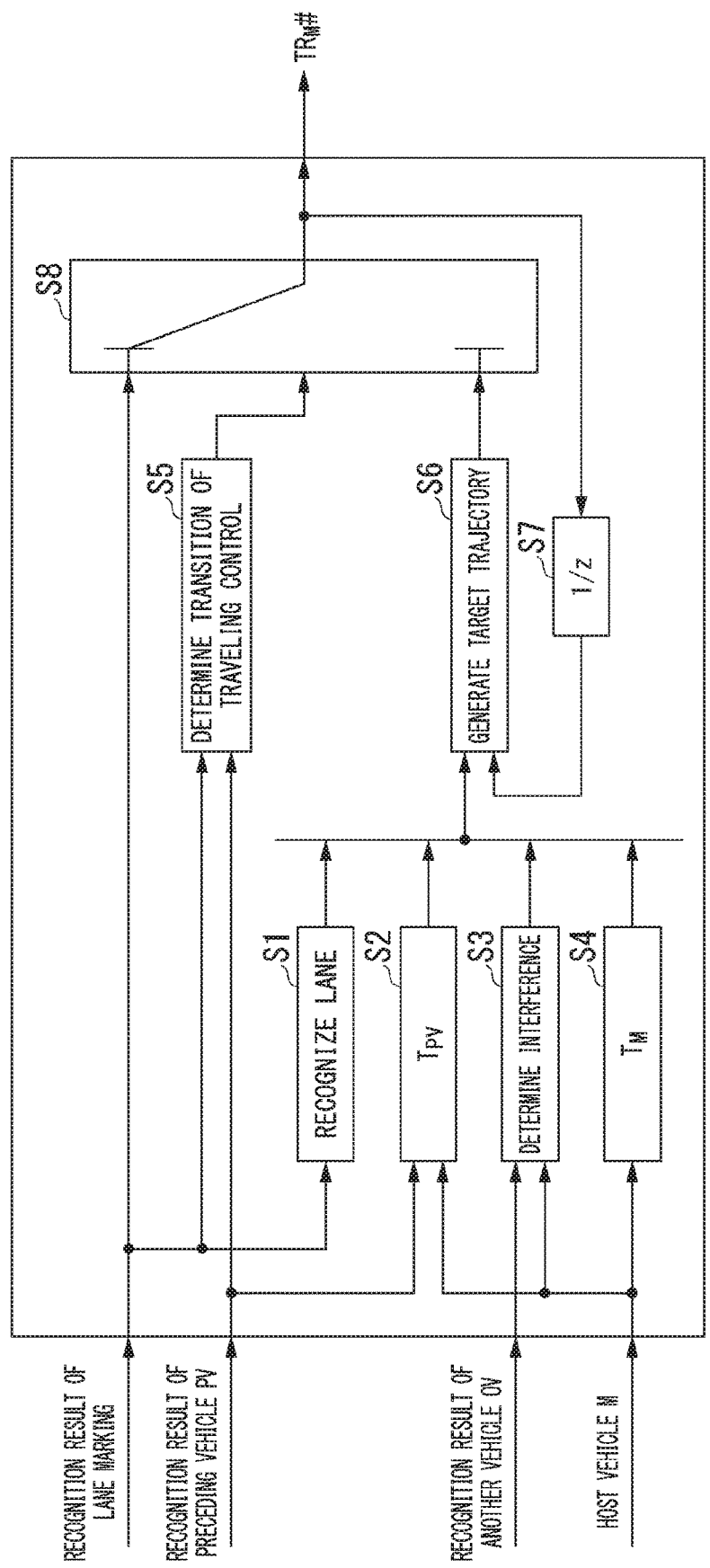
FIG. 10 is an outline diagram showing a processing process when a traveling control unit generates a target trajectory.

FIG. 10 is an outline diagram showing a processing process when the traveling control unit 73 generates a target trajectory. The traveling control unit 73 generates a target trajectory on the basis of a lane marking recognition result recognized by the lane marking recognition unit 72, a recognition result of a preceding vehicle PV which is obtained by the other vehicles recognition unit 71, a recognition result of another vehicle OV which is obtained by the other vehicles recognition unit 71, and a steering history of the host vehicle M itself.

The traveling control unit 73 acquires a recognition result of a traveling lane from the lane marking recognition unit 72 on the basis of the lane marking recognition result (step S1). The traveling control unit 73 acquires a recognition result of the preceding vehicle PV from the other vehicles recognition unit 71 (step S2). The traveling control unit 73 determines whether or not the host vehicle M and another vehicle OV may interfere with each other on the basis of the position of the host vehicle M and the recognition result of another vehicle OV (step S3). The traveling control unit 73 stores a passage trajectory $T_M$ of the host vehicle M (step S4).

The traveling control unit 73 determines traveling control on the basis of whether or not the recognized distance EndX recognized by the lane marking recognition unit 72 is recognized to a distance equal to or greater than a threshold value Th when seen from the host vehicle M (step S5). In step S5, the traveling control unit 73 adds the recognition result of the preceding vehicle PV (whether or not the preceding vehicle PV is changing a lane) and determines whether to cause traveling control of the host vehicle M to transition.

The traveling control unit 73 generates a target trajectory on the basis of the results of steps S1, S2, S3, S4, and S5 (step S6).

The process in step S6 can be classified into the following (1) to (3).

(1) In a case where it is determined in step S3 that the host vehicle and another vehicle OV may interfere with each other, a target trajectory for avoiding another vehicle OV is generated.

(2) In a case where it is determined in step S3 that the host vehicle and another vehicle OV may not interfere with each other and it is determined in step S5 that the recognized distance EndX is equal to or greater than the threshold value Th, a target trajectory for keeping a lane is generated on the basis of the lane marking recognition result.

(3) In a case where it is determined in step S3 that the host vehicle and another vehicle OV may not interfere with each other and it is not determined in step S5 that the recognized distance EndX is equal to or greater than the threshold value Th, a target trajectory for following the preceding vehicle PV is generated.

When a target trajectory is generated in step S6, the traveling control unit 73 generates a target trajectory with reference to the generated target trajectory (step S7). The traveling control unit 73 determines whether to generate a target trajectory for first traveling control and a target trajectory for second traveling control on the basis of the determination result in step S5 (step S8).

[Example of Transition of Traveling Control]

Figure 11:
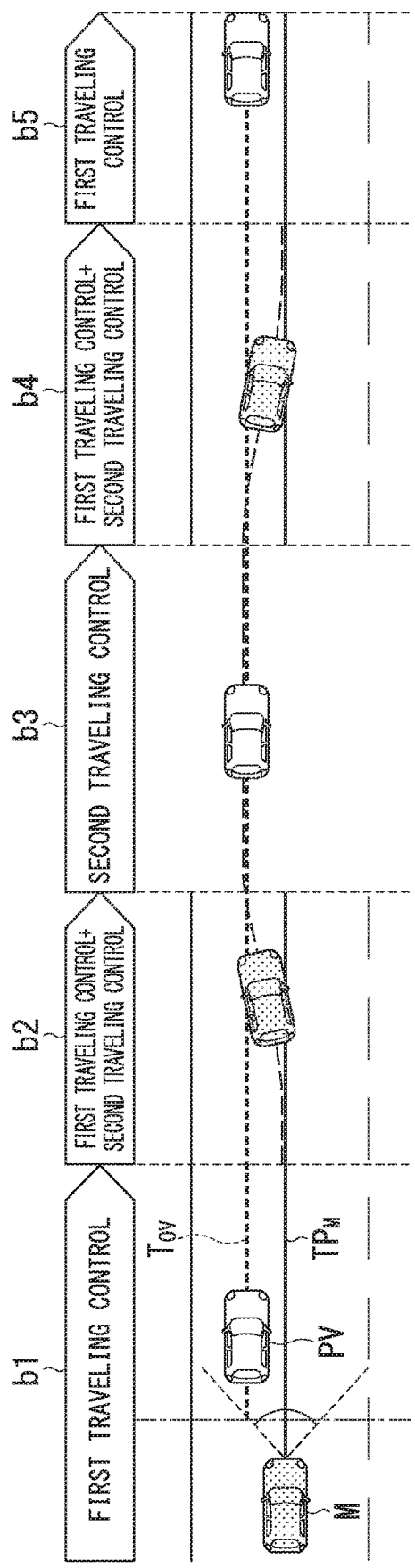
FIG. 11 is a diagram showing a relationship between a lane in which a host vehicle travels and traveling control determined by a traveling control unit.

FIG. 11 is a diagram showing a relationship between a lane in which the host vehicle M travels and traveling control determined by the traveling control unit 73.

The traveling control unit 73 determines to perform the first traveling control in a section b1 and perform transition to the second traveling control while the host vehicle adopts the target trajectory $TP_M$ based on the lane marking recognition result and travels. The traveling control unit 73 generates a hybrid trajectory in a section b2 and performs transition to the second traveling control. The traveling control unit 73 determines to perform second traveling control in a section b3 and return to the first traveling control at a point in time when a lane marking can be recognized again. The traveling control unit 73 generates a hybrid trajectory in a section b4 and performs transition to the first traveling control. The traveling control unit 73 restarts the first traveling control in a section b5.

[Processing Flow]

Figure 12:
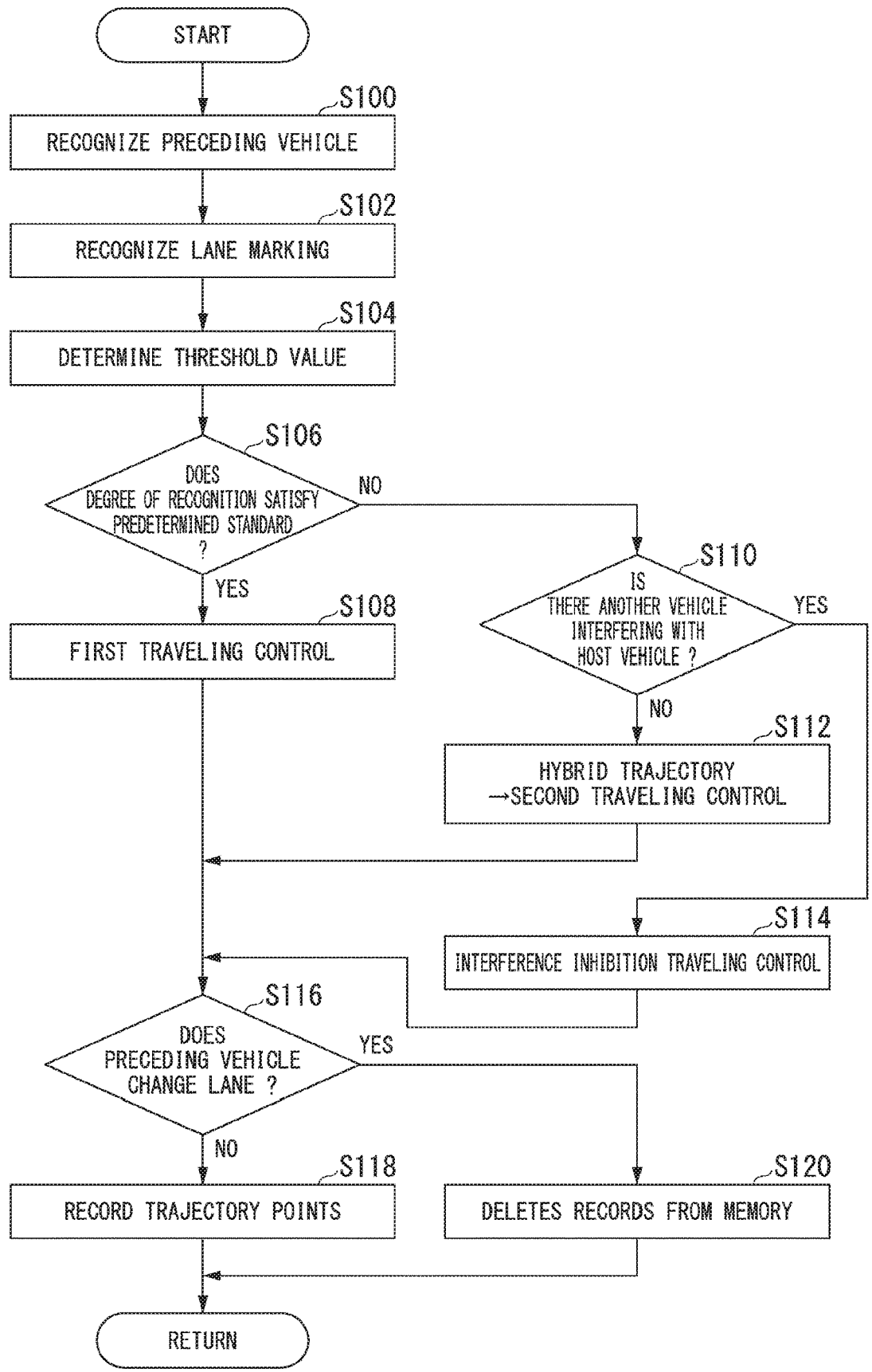
FIG. 12 is a flowchart showing an example of a flow of processing performed by a vehicle control device.

Hereinafter, a flow of processing of the vehicle control device 70 will be described using FIGS. 12 and 13. FIG. 12 is a flowchart showing a flow of processing performed in the sections b1 to b3 in FIG. 11. The flowchart shown in FIG. 12 is repeatedly executed during the first traveling control using a predetermined determination period.

First, the other vehicles recognition unit 71 recognizes a preceding vehicle PV (step S100). Next, the lane marking recognition unit 72 recognizes a lane marking (step S102). Next, the threshold value setting unit 74 determines a threshold value Th (step S104). Next, the traveling control unit 73 determines whether or not the degree of recognition of the lane marking recognized by the lane marking recognition unit 72 satisfies a predetermined standard (step S106). Here, in a case where the predetermined standard is indicated by a recognized distance of the lane marking, it is determined whether or not a recognized distance EndX is equal to or greater than a threshold value Th. In a case where the degree of recognition satisfies the predetermined standard, the traveling control unit 73 causes the first traveling control unit 75 to maintain the first traveling control (step S108). In a case where the degree of recognition does not satisfy the predetermined standard, the traveling control unit 73 determines whether or not there is another vehicle OV interfering with the host vehicle M (step S110). In a case where it is not determined that there is another vehicle OV, the traveling control unit 73 generates a hybrid trajectory and causes the second traveling control unit 76 to transition to the second traveling control (step S112). In a case where it is determined that there is another vehicle OV, the traveling control unit 73 generates a target trajectory for inhibiting interference with another vehicle OV and performs traveling control on the basis of the trajectory (step S114).

After the processes of steps S108, S112, and S114, the second traveling control unit 76 determines whether or not the preceding vehicle PV is changing lane (step S116). In a case where it is not determined that the preceding vehicle PV is changing a lane, the preceding vehicle trajectory recording unit 77 records trajectory points in the memory 78 (S118). In a case where it is determined that the preceding vehicle PV is changing a lane, the preceding vehicle trajectory recording unit 77 deletes the records of the trajectory points stored in the memory 78 (S120). Then, the description of the processing of the present flowchart is terminated.

Figure 13:
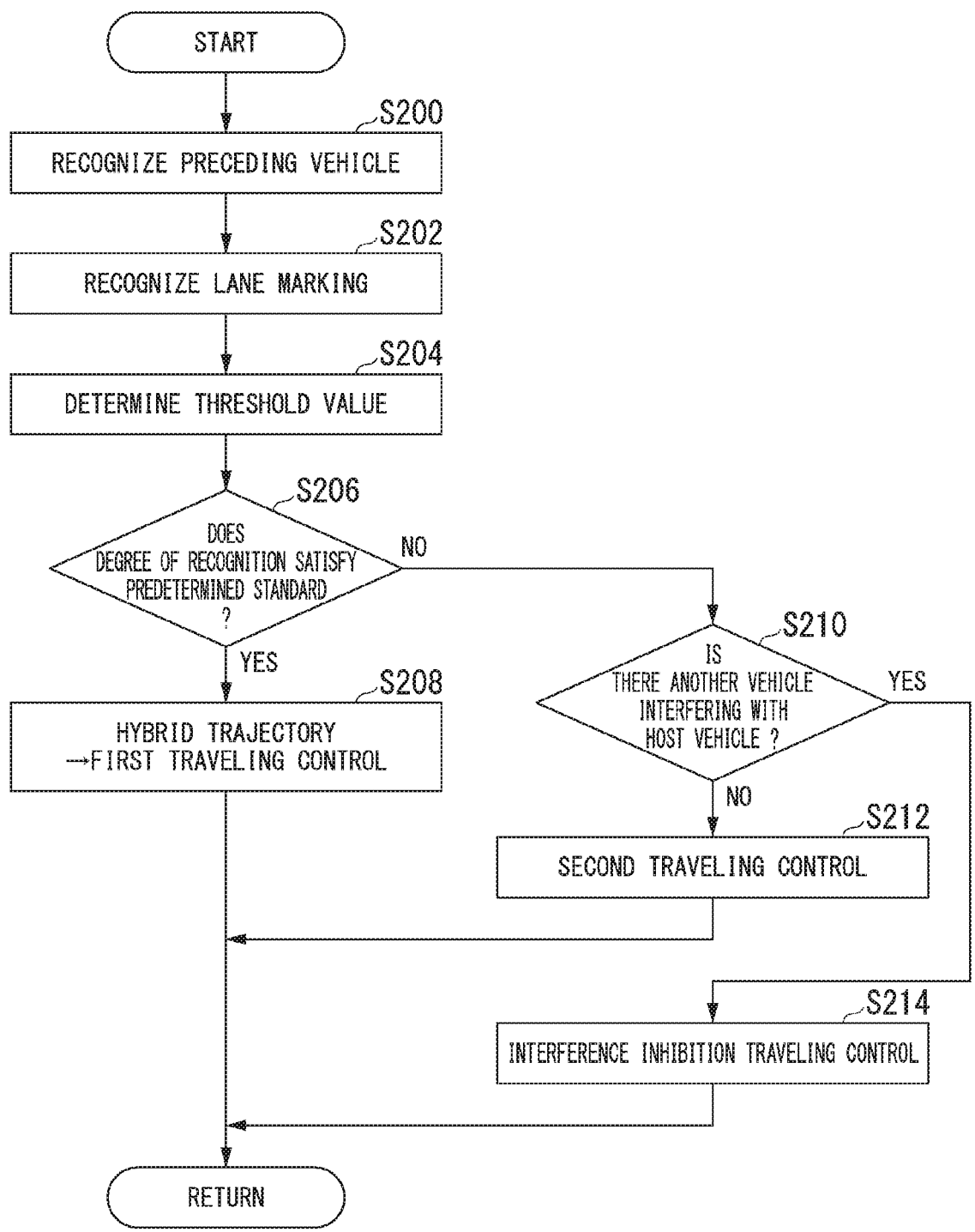
FIG. 13 is a flowchart showing an example of a flow of processing performed by a vehicle control device.

FIG. 13 is executed after switching to the second traveling control is performed in step S112 of FIG. 12. FIG. 13 is a flowchart showing a flow of processing performed in the sections b3 to b5 in FIG. 11. The flowchart shown in FIG. 13 is repeatedly executed during the second traveling control at predetermined determination cycles.

First, the other vehicles recognition unit 71 recognizes a preceding vehicle PV (step S200). Next, the lane marking recognition unit 72 recognizes a lane marking (step S202). Next, the threshold value setting unit 74 determines a threshold value Th (step S204). Next, the traveling control unit 73 determines whether or not the degree of recognition satisfies a predetermined standard (step S206). In a case where the degree of recognition satisfies the predetermined standard, the traveling control unit 73 generates a hybrid trajectory and causes the first traveling control unit 75 to transition to the first traveling control (step S208). In a case where the degree of recognition does not satisfy the predetermined standard, the traveling control unit 73 determines whether or not there is another vehicle OV interfering with the host vehicle M (step S210). In a case where it is not determined that there is another vehicle OV, the traveling control unit 73 causes the second traveling control unit 76 to maintain the second traveling control (step S212). In a case where it is determined that there is another vehicle OV, the traveling control unit 73 generates a target trajectory for inhibiting interference with another vehicle OV and performs traveling control on the basis of the trajectory (step S214). Then, the description of the processing of the present flowchart is terminated.

According to the above-described first embodiment, there are provided the other vehicles recognition unit 71 that recognizes the surroundings where the host vehicle M travels and a surrounding vehicle, the lane marking recognition unit 72 that recognizes lane markings LL and LR for sectioning the lane R1 in which the host vehicle M travels, and the traveling control unit 73 that performs first traveling control for causing the host vehicle M to travel along a traveling route based on the lane markings LL and LR recognized by the lane marking recognition unit 72 in a case where the degree of recognition of the lane marking recognized by the lane marking recognition unit 72 satisfies a predetermined standard and performs second traveling control for causing the host vehicle M to travel on the basis of a passage trajectory $T_{PV}$ of a preceding vehicle PV recognized by the other vehicles recognition unit 71 in a case where the degree of recognition of the lane marking recognized by the lane marking recognition unit 72 does not satisfy the predetermined standard, in which the traveling control unit 73 can appropriately perform determination for performing transition from control based on a lane marking to control in another mode by changing the predetermined standard on the basis of a vehicle speed V of the host vehicle M.

Second Embodiment

Hereinafter, a vehicle system 1A according to a second embodiment will be described. In the second embodiment, description will be given on the assumption that a traveling control function is realized through automatic driving.

[Overall Configuration 2]

Figure 14:
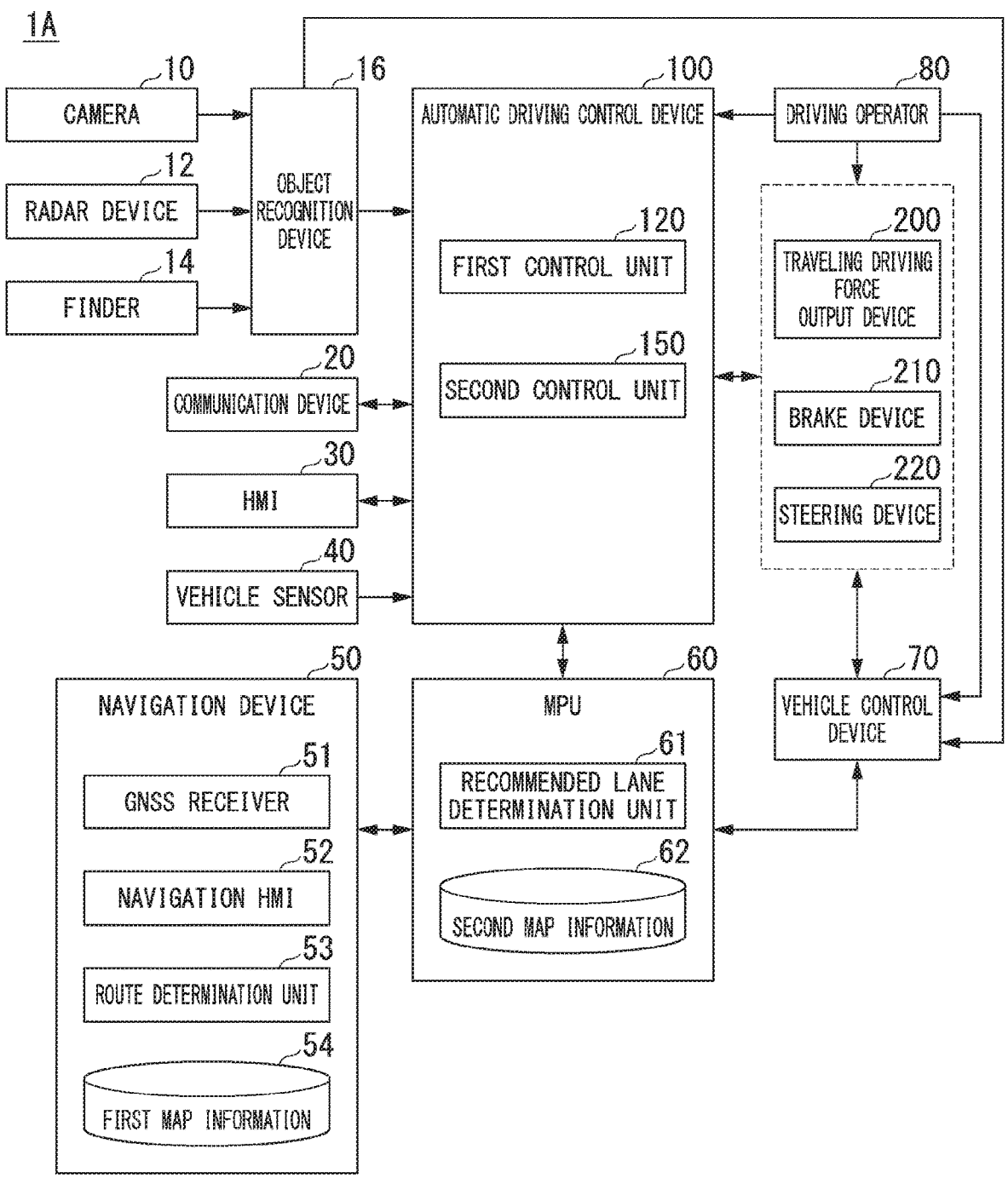
FIG. 14 is a configuration diagram of a vehicle system according to a second embodiment.

FIG. 14 is a configuration diagram of the vehicle system 1A according to the second embodiment. The vehicle system 1A includes an automatic driving control device 100 and a vehicle control device 70. The vehicle control device 70 is the same as that described in the first embodiment. The vehicle control device 70 may be omitted from the vehicle system 1A. The automatic driving control device 100 includes a first control unit 120 and a second control unit 150. The automatic driving control device 100 is another example of a "vehicle control device". The vehicle system 1A further includes a communication device 20, a human machine interface (HMI) 30, a vehicle sensor 40, a navigation device 50, and a map positioning unit (MPU) 60, in addition to the vehicle system 1 of the first embodiment. Therefore, hereinafter, description will be given focusing on differences from the first embodiment.

The communication device 20 communicates with another vehicle present in the vicinity of the host vehicle M using, for example, a cellular network, a Wi-Fi network, Bluetooth (registered trademark), dedicated short range communication (DSRC) or the like or communicates with various server devices through a wireless base station.

The HMI 30 presents various information to an occupant of the host vehicle M and receives the occupant's input operation. The HMI 30 includes various display devices, a speaker, a buzzer, a touch panel, switches, keys, and the like.

The vehicle sensor 40 includes a vehicle speed sensor that detects the speed of the host vehicle M, an acceleration sensor that detects an acceleration, a yaw rate sensor that detects an angular velocity around a vertical axis, and an orientation sensor that detects the direction of the host vehicle M, and the like.

The navigation device 50 includes, for example, a global navigation satellite system (GNSS) receiver 51, a navigation HMI 52, and a route determination unit 53. The navigation device 50 stores first map information 54 in a storage device such as a hard disk drive (HDD) or a flash memory. The GNSS receiver 51 identifies the position of the host vehicle M on the basis of a signal received from a GNSS satellite. The position of the host vehicle M may be identified or supplemented by an inertial navigation system (INS) using the output of the vehicle sensor 40. The navigation HMI 52 includes a display device, a speaker, a touch panel, keys, and the like. The navigation HMI 52 may be partially or entirely shared with the above-described HMI 30. For example, the route determination unit 53 determines a path (hereinafter, a route on a map) from the position (or any input position) of the host vehicle M determined by the GNSS receiver 51 to a destination which is input by an occupant using the navigation HMI 52 with reference to the first map information 54. The first map information 54 is information in which the shape of a road is expressed by a link indicating the road and a node connected by the link. The first map information 54 may include a gradient of the road (gradient information associated with the direction of the link), a curvature of the road, point of interest (POI) information, and the like. The route on a map is output to the MPU 60. The navigation device 50 associates whether the road is an uphill or a downhill with each divided section in the route on the map with reference to the gradient information of the first map information 54. A process of associating a gradient with the divided section of the route may be performed using second map information 62 by the MPU 60. The navigation device 50 may perform route guidance using the navigation HMI 52 on the basis of the route on the map. The navigation device 50 may be realized by, for example, a function of a terminal device such as a smartphone or a tablet terminal carried by an occupant. The navigation device 50 may transmit the present position and a destination to a navigation server through the communication device 20 and may acquire the same route as the route on the map from the navigation server.

The MPU 60 includes, for example, a recommended lane determination unit 61 and stores the second map information 62 in a storage device such as an HDD or a flash memory. The recommended lane determination unit 61 divides the route on the map provided from the navigation device 50 into a plurality of blocks (for example, divides the route for each 100 [m] in the moving direction of the vehicle) and determines a recommended lane for each block with reference to the second map information 62. The recommended lane determination unit 61 determines in which lane from the left the vehicle travels. In a case where there is a branch point on the route on the map, the recommended lane determination unit 61 determines a recommended lane so that the host vehicle M can travel along a reasonable route for advancing to a branch destination.

The second map information 62 is map information with higher accuracy than the first map information 54. The second map information 62 includes, for example, information on the center of a lane, information on a boundary of a lane, or the like. The second map information 62 may include road information, traffic regulation information, address information (address and a postal code), facility information, telephone number information, and the like. The second map information 62 may be updated at any times by the communication device 20 communicating with another device.

Each of the first control unit 120 and the second control unit 150 is realized by causing a hardware processor such as a CPU to execute a program (software). Some or all of the components may be realized by hardware (including a circuit unit; circuitry) such as an LSI, an ASIC, a FPGA, or a GPU or may be realized by cooperation of software and hardware. The program may be stored in advance in a storage device (a storage device including a non-transitory storage medium) such as an HDD or a flash memory of the vehicle control device 70 or may be stored in a detachable storage medium (non-transitory storage medium) such as a DVD or a CD-ROM, or a storage medium may be mounted on a drive device to be installed in the HDD or the flash memory of the vehicle control device 70.

Figure 15:
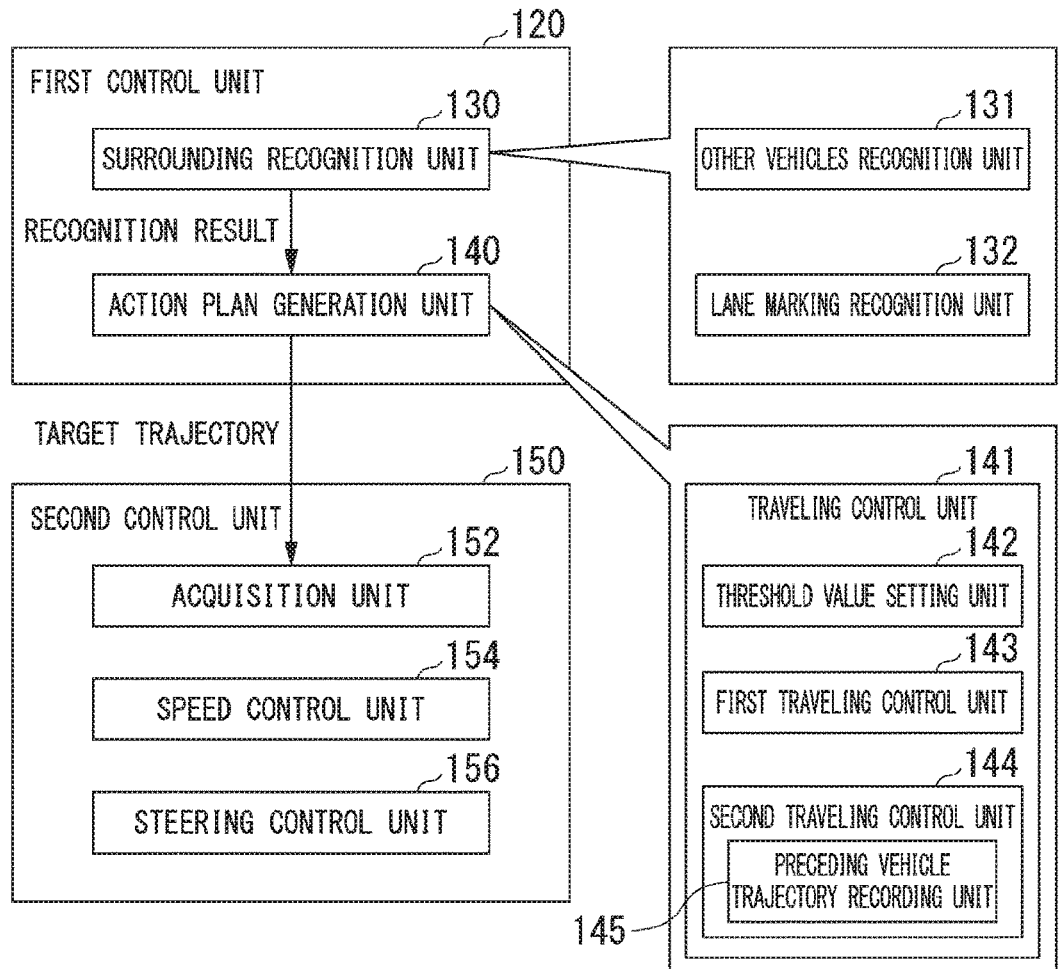
FIG. 15 is a functional configuration diagram of a first control unit and a second control unit.

FIG. 15 is a functional configuration diagram of the first control unit 120 and the second control unit 150. The first control unit 120 and the second control unit 150 are realized by causing a hardware processor such as a CPU to execute a program (software). Some or all of the components may be realized by hardware (including a circuit unit; circuitry) such as an LSI, an ASIC, a FPGA, or a GPU or may be realized by cooperation of software and hardware. The program may be stored in advance in a storage device such as an HDD or a flash memory of the automatic driving control device 100 or may be stored in a detachable storage medium such as a DVD or a CD-ROM, or a storage medium may be mounted on a drive device to be installed in the HDD or the flash memory of the automatic driving control device 100. The first control unit 120 includes, for example, a surrounding recognition unit 130 and an action plan generation unit 140. The first control unit 120 realizes a function using artificial intelligence (AI) and a function using a predetermined model in parallel. For example, a function of "recognizing an intersection" may be realized by performing recognition of an intersection using deep learning or the like and recognition based on predetermined conditions (including a pattern-matchable signal, a road mark, a road sign, and the like) in parallel, giving scores to both, and comprehensively evaluating both. Thereby, the reliability of automatic driving is secured.

The surrounding recognition unit 130 recognizes the position of an object present in the vicinity of the host vehicle M and a state such as a speed or an acceleration on the basis of information input from the camera 10, the radar device 12, and the finder 14 through the object recognition device 16. For example, the position of the object is recognized as a position on absolute coordinates with a representative point (the center of gravity, the center of a driving shaft, or the like) of the host vehicle M as a starting point and is used for control. The position of the object may be represented by a representative point such as the center of gravity of the object or a corner or may be represented by an expressed region. The "state" of the object may include an acceleration or a jerk of the object, or an "action state" (for example, whether or not lane change is performed or attempted).

The surrounding recognition unit 130 recognizes, for example, a lane (traveling lane) in which the host vehicle M is traveling. For example, the surrounding recognition unit 130 may recognize a traveling lane by comparing a pattern (for example, an array of solid lines and broken lines) of a road section line obtained from the second map information 62 with a pattern of a road section line in the vicinity of the host vehicle M which is recognized from an image captured by the camera 10. The surrounding recognition unit 130 may recognize a traveling lane by recognizing a traveling road boundary (road boundary) including not only a road section line but also a road section line or a road shoulder, a curb, a central reservation, a guardrail, and the like. In this recognition, the position of the host vehicle M acquired from the navigation device 50 and processing results obtained by an INS may be added. The surrounding recognition unit 130 recognizes a stop line, an obstacle, a red light, a tollbooth, and other road events.

The surrounding recognition unit 130 recognizes the position and posture of the host vehicle M with respect to a traveling lane at the time of recognizing the traveling lane. The surrounding recognition unit 130 may recognize, for example, a deviation of the reference point of the host vehicle M from the center of a lane and an angle formed by a line connecting the center of a lane in a traveling direction of the host vehicle M as a relative position and posture of the host vehicle M with respect to the traveling lane. Alternatively, the surrounding recognition unit 130 may recognize the position of the reference point of the host vehicle M with respect to any side end portion (a road section line or a road boundary) of the traveling lane, or the like as a relative position of the host vehicle M with respect to the traveling lane.

The surrounding recognition unit 130 includes, for example, an other vehicles recognition unit 131 and a lane marking recognition unit 132. The other vehicles recognition unit 131 has the same function as the other vehicles recognition unit 71 of the first embodiment, and the lane marking recognition unit 132 has the same function as the lane marking recognition unit 132 of the first embodiment.

The action plan generation unit 140 travels in a recommended lane determined by the recommended lane determination unit 61 in principle and generates a target trajectory along which the host vehicle M will automatically (without depending a driver's operation) travel in the future so as to be capable of coping with peripheral conditions of the host vehicle M. The target trajectory includes, for example, a speed element. For example, the target trajectory is represented by an array of sequential points (trajectory points) at which the host vehicle M will arrive. The trajectory point is a point at which the host vehicle M will arrive for each predetermined traveling distance (for example, approximately several [m]) at a distance along a road. Aside from this, a target speed and a target acceleration for each predetermined sampling time (for example, approximately 0 comma [sec]) are generated as a portion of the target trajectory. The trajectory point may be a position where the host vehicle M will arrive at a sampling time for each predetermined sampling time. In this case, information on the target speed and the target acceleration is expressed at intervals of the trajectory points.

The action plan generation unit 140 may set an automatic driving event in generating a target trajectory. The automatic driving event includes an in-lane traveling event, a constant speed traveling event, a following traveling event (following traveling control to be described below) including a low-speed following traveling event, a lane change event, a branch event, a joining event, a take-over event, and the like. The action plan generation unit 140 generates a target trajectory associated with a started event.

The surrounding recognition unit 130 includes, for example, a traveling control unit 141. The traveling control unit 141 performs an operation when the above-described in-lane traveling event is started. The traveling control unit 141 has the same function as that of the traveling control unit 73 of the first embodiment.

The traveling control unit 141 includes, for example, a threshold value setting unit 142, a first traveling control unit 143, and a second traveling control unit 144. The threshold value setting unit 142 has the same function as that of the threshold value setting unit 74 of the first embodiment, the first traveling control unit 143 has the same function as that of the first traveling control unit 75 of the first embodiment, and the second traveling control unit 144 has the same function as that of the second traveling control unit 76 of the first embodiment. The second traveling control unit 144 includes, for example, a preceding vehicle trajectory recording unit 145. The preceding vehicle trajectory recording unit 145 has the same function as that of the preceding vehicle trajectory recording unit 77 of the first embodiment.

The second control unit 150 controls the traveling driving force output device 200, the brake device 210, and the steering device 220 so that the host vehicle M passes through a target trajectory generated by the action plan generation unit 140 at a scheduled time.

The second control unit 150 travels in a recommended lane determined by the recommended lane determination unit 61 in principle and generates a target trajectory along which the host vehicle M will automatically (without depending a driver's operation) travel in the future so as to be capable of coping with peripheral conditions of the host vehicle M. The target trajectory includes, for example, a speed element. For example, the target trajectory is represented by an array of sequential points (trajectory points) at which the host vehicle M will arrive. The trajectory point is a point at which the host vehicle M will arrive for each predetermined traveling distance (for example, approximately several [m]) at a distance along a road. Aside from this, a target speed and a target acceleration for each predetermined sampling time (for example, approximately 0 comma [sec]) are generated as a portion of the target trajectory. The trajectory point may be a position where the host vehicle M will arrive at a sampling time for each predetermined sampling time. In this case, information on the target speed and the target acceleration is expressed at intervals of the trajectory points.

[Transition of Traveling Control During Automatic Driving]

Hereinafter, processing of the traveling control unit 141 in the second embodiment will be described. In the following description, a state where automatic driving not requiring gripping of the driving operator 80 by an occupant of the host vehicle M can be executed and a mode of automatic driving not requiring gripping of the driving operator 80 by the occupant is executed will be referred to as a "first state", and a state where a mode of automatic driving requiring gripping of the driving operator 80 by an occupant of the host vehicle M is executed will be referred to as a "second state". The automatic driving state is managed by, for example, the action plan generation unit 140.

The first state includes, for example, a state where a traffic jam pilot (hereinafter, referred to as TJP) system or an equivalent system is operated. For example, the TJP is a control mode in which the host vehicle follows a preceding vehicle at a predetermined speed (for example, 60 [km/h]) or less or a control mode in which the host vehicle follows a preceding vehicle during high-speed road traveling. The TJP may be actuated when, for example, the speed of the host vehicle M is equal to or less than a predetermined speed and an inter-vehicle distance from a preceding vehicle is within a predetermined distance. The HMI 30 notifies an occupant whether or not the TJP is executed or whether or not the host vehicle is in a state where transition to driving assistance of the TJP can be performed.

[Precedence of Automatic Driving Control]

In a case where the host vehicle M is in the first state, the traveling control unit 141 performs only first traveling control without performing second traveling control. In a case where a lane marking is lost, the traveling control unit 141 waits for transition to the second state by the action plan generation unit 140 without performing the second traveling control. The case where a lane marking is lost means that the degree of recognition of a lane marking recognized by the lane marking recognition unit 132 does not satisfy a predetermined standard. After transition to the second state is performed (an occupant of the host vehicle M grips the driving operator 80), the second traveling control can be executed by the traveling control unit 141.

The threshold value setting unit 142 sets a threshold value Th to be referred to by the traveling control unit 141. The first traveling control unit 143 causes the host vehicle M to travel along a traveling route based on a lane marking recognized by the lane marking recognition unit 132 as the first traveling control. The second traveling control unit 144 causes the host vehicle M to travel along a trajectory of a preceding vehicle recognized by the other vehicles recognition unit 131 as the second traveling control. The preceding vehicle trajectory recording unit 145 records trajectory points of the preceding vehicle in a memory (not shown) at predetermined time intervals. The preceding vehicle trajectory recording unit 145 may record trajectory points of a preceding vehicle PV even in the first state in preparation for switching to the second state.

In a case where the host vehicle M is in the second state, the traveling control unit 141 executes a traveling control function based on the first traveling control or the second traveling control, similar to the first embodiment. When the host vehicle M in the first state transitions to the second state, the traveling control unit 141 may perform adjustment so that the threshold value Th varies depending on the degree of automatic driving in the first state before transition (where or not there is a duty to keep eyes on the front or to monitor the surroundings). Such control is realized, and thus it is possible to perform switching of traveling control depending on the state of an occupant.

In a case where the second traveling control is performed, the traveling control unit 141 determines whether to perform the second traveling control on the basis of at least some of an inter-vehicle distance from a preceding vehicle, the type of preceding vehicle, and conditions related to a moving direction of the host vehicle M (for example, whether or not there is another vehicle OV interfering with the host vehicle).

The traveling control unit 141 may change a predetermined standard in accordance with a state where an occupant grips the driving operator 80 (including whether or not the occupant grips the driving operator, and a gripping time) in the first state, or may change a predetermined standard such that it is easy to continue the first traveling control and it is hard to transition to the second traveling control, for example, in a case where the occupant is gripping the driving operator 80.

[Processing Flow]

Figure 16:
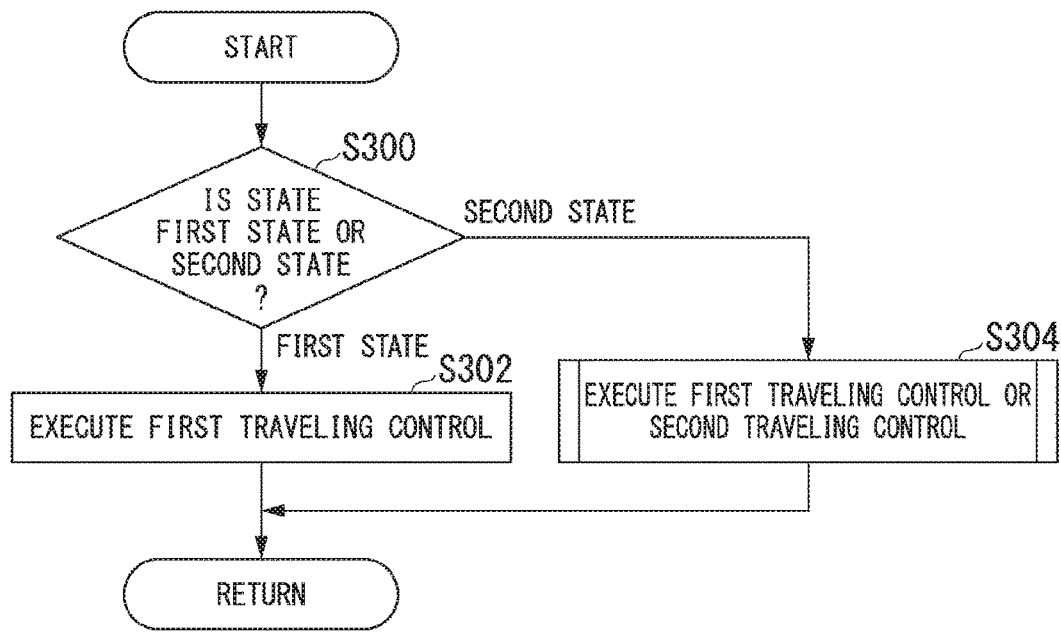
FIG. 16 is a flowchart showing an example of a flow of processing performed by a traveling control unit.

FIG. 16 is a flowchart showing an example of a flow of processing performed by the traveling control unit 141.

First, the traveling control unit 141 determines whether the state of automatic driving executed by the automatic driving control device 100 is the first state or the second state (step S300). In a case where the traveling control unit 141 determines that the state is the first state, the traveling control unit 141 executes only the first traveling control (step S302). In this case, the traveling control unit 141 waits for the second state when a lane marking is lost, and then performs the second traveling control. In a case where the traveling control unit 141 determines that the state is the second state, the first traveling control or the second traveling control is performed (step S304). Then, the description of the processing of the present flowchart is terminated.

According to the above-described second embodiment, in addition to exhibiting the same effects as those in the first embodiment, driving assistance is realized through first traveling control of the automatic driving control device 100 or first traveling control and second traveling control of the vehicle control device 70 in a case where the host vehicle M is an automatic driving vehicle, and it is possible to properly use control based on automatic driving and control based on a lane marking or a preceding vehicle.

Third Embodiment

Hereinafter, a third embodiment will be described. The third embodiment will be described by adopting the vehicle system 1A of the second embodiment shown in FIGS. 14 and 15 (the second traveling control unit 144 and the preceding vehicle trajectory recording unit 145 are omitted). In the present embodiment, a state where automatic driving by an automatic driving control device 100 is operating is referred to as a "first state", and a state where the automatic driving control device 100 is stopped is referred to as a "second state".

In the third embodiment, in a case of the first state where the automatic driving control device 100 is operating, second traveling control is not performed, and first traveling control (or high-degree traveling control) is executed by a first traveling control unit 143. In a case of the second state where the automatic driving control device 100 is stopped, a vehicle control device 70 executes any one of the first traveling control by a first traveling control unit 75 and the second traveling control by a second traveling control unit 76 (similar to the first embodiment) or selects whether to switch control to manual control by an occupant of a host vehicle M.

In a case where a lane marking recognized by a lane marking recognition unit 132 is lost in the first state, the automatic driving control device 100 stops automatic driving. Thereafter, the vehicle control device 70 may be operated to execute the second traveling control.

[Processing Flow]

Hereinafter, an example of a flow of processing performed by the vehicle system 1A in the third embodiment will be described adopting a flowchart of FIG. 16.

First, a traveling control unit 141 determines whether a state is the first state or the second state (step S300). In a case where the traveling control unit 141 determines that a state is the first state, the first traveling control is executed by the first traveling control unit 143 (step S302). In this case, when a lane marking is lost, the traveling control unit 141 waits for the second state, and then the vehicle control device 70 performs the second traveling control (or a manual operation by an occupant).

In a case where it is determined in step S300 that a state is the second state, the vehicle control device 70 performs the first traveling control or the second traveling control (or a manual operation by an occupant) (step S304). Then, the description of the processing of the present flowchart is terminated.

According to the above-described third embodiment, in addition to exhibiting the same effects as those in the first embodiment, it is possible to properly use control based on automatic driving and control based on a lane marking or a preceding vehicle in a case where the host vehicle M is an automatic driving vehicle.

[Hardware Configuration]

Figure 17:
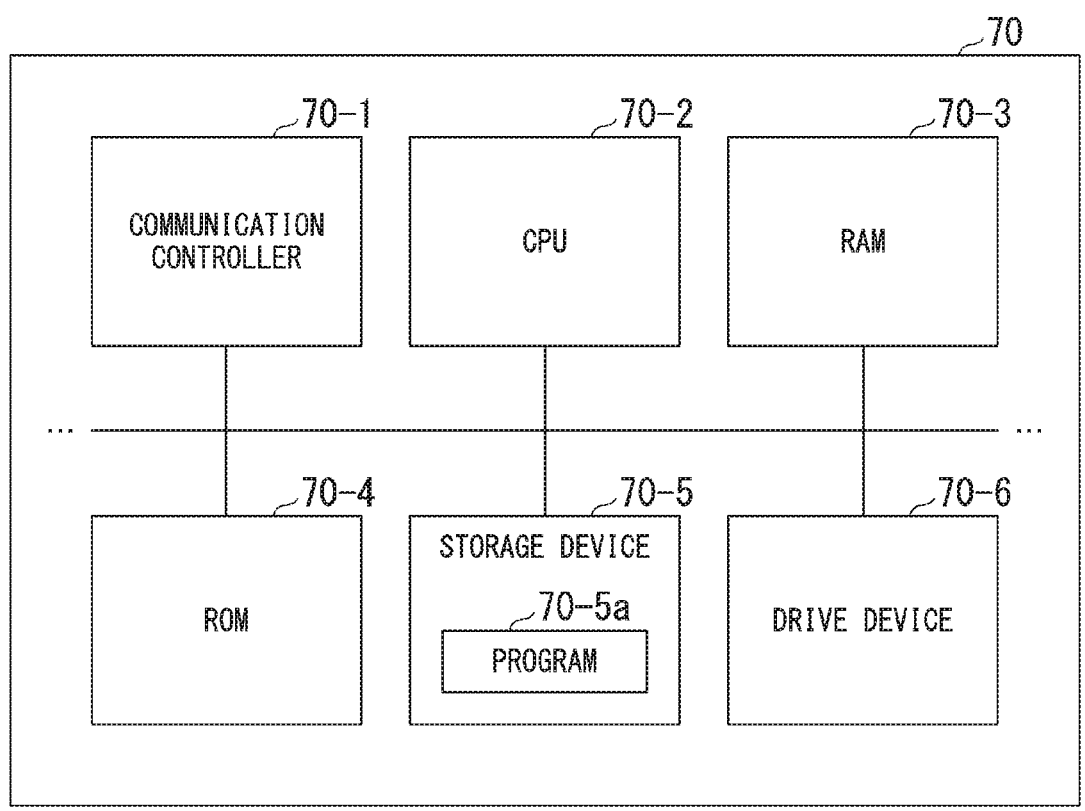
FIG. 17 is a diagram showing an example of a hardware configuration of a vehicle control device and an automatic driving control device according to the embodiments.

FIG. 17 is a diagram showing an example of a hardware configuration of the vehicle control device 70 and the automatic driving control device 100 of each embodiment. As shown in the drawing, a control device is configured such that a communication controller 70-1, a CPU 70-2, a RAM 70-3 used as a working memory, a ROM 70-4 storing a boot program and the like, a storage device 70-5 such as a flash memory or an HDD, a drive device 70-6, and the like are connected to each other through an internal bus or a dedicated communication line. The communication controller 70-1 communicates with components other than the vehicle control device 70. A portable storage medium (for example, a computer-readable non-transitory storage medium) such as an optical disc is mounted on the drive device 70-6. A program 70-5a executed by the CPU 70-2 is stored in the storage device 70-5. The program is developed to the RAM 70-3 using a direct memory access (DMA) controller (not shown) or the like and is executed by the CPU 70-2. In addition, the program 70-5a referred to by the CPU 70-2 may be stored in the portable storage medium mounted on the drive device 70-6 or may be downloaded from another device through a network. Thereby, some or all of the vehicle control devices 70 and the automatic driving control devices 100 are realized.

The above-described embodiments can be expressed as follows.

A vehicle control device is configured to include:
a storage device storing a program; and
a hardware processor,
wherein the hardware processor executes the program stored in the storage device to cause a host vehicle to recognize a lane marking for distinguishing a preceding vehicle and a lane in which the host vehicle travels from each other,
a vehicle control method includes performing first traveling control for causing the host vehicle to travel along a traveling route based on the recognized lane marking in a case where the degree of recognition of the lane marking satisfies a predetermined standard and performing second traveling control for causing the host vehicle to travel on the basis of a trajectory of the preceding vehicle in a case where the degree of recognition of the lane marking does not satisfy the predetermined standard, and
the predetermined standard is changed on the basis of a vehicle speed of the host vehicle.

Although the embodiments of the present invention have been described, the present invention is not limited to the embodiments, and various modifications and substitutions can be made without departing from the scope of the present invention.

What is claimed is:

1. A vehicle control device comprising:
a processor; and
a memory that stores executable instructions that, when executed by the processor, facilitate performance of operations, comprising:
recognizing a preceding vehicle;
recognizing a lane marking for sectioning a lane in which a host vehicle travels; and
performing first traveling control for causing the host vehicle to travel along a traveling route based on the lane marking in a case where the lane marking recognized is recognized to be a distance equal to or greater than a threshold value when seen from the host vehicle,
performing second traveling control for causing the host vehicle to travel on a basis of a trajectory of the preceding vehicle in a case where the lane marking recognized is not recognized to be a distance equal to or greater than the threshold value when seen from the host vehicle,
wherein the threshold value is changed on a basis of a vehicle speed of the host vehicle, and
when transitioning from one traveling control to another traveling control, setting a hybrid trajectory during the transition.

2. The vehicle control device according to claim 1, wherein the operations further comprise:
determining whether to perform the first traveling control or the second traveling control on a basis of whether or not a furthest recognizable lane marking, out of lane markings on right and left sides of the host vehicle, satisfies the threshold value.

3. The vehicle control device according to claim 1, wherein the operations further comprise:
changing the threshold value such that the threshold value is more easily satisfied by the first traveling control than the second traveling control as the vehicle speed of the host vehicle increases.

4. The vehicle control device according to claim 3, wherein an upper limit is provided for a degree to which the threshold value is changed such that the threshold value is more easily satisfied by the first traveling control than the second traveling control.

5. The vehicle control device according to claim 1, wherein the operations further comprise:
recognizing surroundings where the host vehicle is traveling, and
wherein in a case where the second traveling control is performed, determining whether or not to perform the second traveling control on a basis of at least one condition selected from a group conditions comprising a condition regarding an inter-vehicle distance from the preceding vehicle, a condition regarding a type of preceding vehicle, and a condition regarding a moving direction of the host vehicle.

6. The vehicle control device according to claim 1, wherein
the processor is capable of executing a mode of automatic driving not requiring gripping of a driving operator by a driver and a mode of automatic driving requiring gripping, and wherein the operations further comprise:
determining to perform the first traveling control in a case where the mode of automatic driving not requiring gripping is executed, and
determining whether to perform the first traveling control or the second traveling control in a case where the mode of automatic driving requiring gripping is executed.

7. The vehicle control device according to claim 6, wherein the operations further comprise:
varying the threshold value depending on a degree of automatic driving.

8. The vehicle control device according to claim 1, wherein the operations further comprise:
starting a process for switching to the second traveling control in a case where it is predicted that lane markings will not be able to be recognized.

9. The vehicle control device according to claim 1, wherein the operations further comprise:
storing the trajectory of the preceding vehicle in the memory in preparation for a start of the second traveling control, stopping a recording of the trajectory of the preceding vehicle in a case where the preceding vehicle changes a lane, and deleting a result of the recording.

10. The vehicle control device according to claim 1, wherein the operations further comprise:
determining traveling control or length of the hybrid trajectory in accordance with type, size, width, and length of the preceding vehicle and width of a line on which the host vehicle travels.

11. A vehicle control method comprising:
causing a computer to:
recognize lane markings for sectioning a preceding vehicle and a lane in which the host vehicle travels;
perform first traveling control for causing the host vehicle to travel along a traveling route based on a recognized lane marking in a case where the recognized lane marking is recognized to be distance equal to or greater than a threshold value when seen from the host vehicle; and
perform second traveling control for causing the host vehicle to travel on a basis of a trajectory of the preceding vehicle in a case where the recognized lane marking is not recognized to be a distance equal to or greater than the threshold value when seen from the host vehicle,
wherein the threshold value is changed on a basis of a vehicle speed of the host vehicle, and
when transitioning from one traveling control to another traveling control, set a hybrid trajectory during the transition.

12. The vehicle control method according to claim 11, wherein the vehicle control method further causes the computer to:
determine traveling control or length of the hybrid trajectory in accordance with type, size, width, and length of the preceding vehicle and width of a line on which the host vehicle travels.

13. A computer-readable non-transitory storage medium storing a program causing a computer to:
recognize lane markings for sectioning a preceding vehicle and a lane in which the host vehicle travels;
perform first traveling control for causing the host vehicle to travel along a traveling route based on a recognized lane marking in a case where the recognized lane marking is recognized to be a distance equal to or greater than a threshold value when seen from the host vehicle; and
perform second traveling control for causing the host vehicle to travel on a basis of a trajectory of the preceding vehicle in a case where the recognized lane marking is not recognized to be a distance equal to or greater than the threshold value when seen from the host vehicle,
wherein the threshold value is changed on a basis of a vehicle speed of the host vehicle, and
when transitioning from one traveling control to another traveling control, set a hybrid trajectory during the transition.

14. The computer-readable non-transitory storage medium according to claim 13, wherein the program further causes the computer to:
determine traveling control or length of the hybrid trajectory in accordance with type, size, width, and length of the preceding vehicle and width of a line on which the host vehicle travels.

* * * * *